(12) United States Patent
Higgins

(10) Patent No.: US 6,511,020 B2
(45) Date of Patent: Jan. 28, 2003

(54) METHOD FOR LIMITING INTERFERENCE BETWEEN SATELLITE COMMUNICATIONS SYSTEMS

(75) Inventor: Robert P. Higgins, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/755,655

(22) Filed: Jan. 5, 2001

(65) Prior Publication Data

US 2001/0045494 A1 Nov. 29, 2001

Related U.S. Application Data

(60) Provisional application No. 60/174,873, filed on Jan. 7, 2000.

(51) Int. Cl.[7] .................................................. B64G 1/10
(52) U.S. Cl. ..................... 244/158 R; 244/159; 244/173
(58) Field of Search ............................ 244/158 R, 159, 244/173

(56) References Cited

U.S. PATENT DOCUMENTS

| | | | | |
|---|---|---|---|---|
| 5,433,726 A | * | 7/1995 | Horstein et al. | 244/158 R |
| 5,551,624 A | * | 9/1996 | Horstein et al. | 244/158 R |
| 5,589,834 A | * | 12/1996 | Weinberg | 342/354 |
| 5,638,399 A | * | 6/1997 | Schuchman et al. | 342/353 |
| 5,758,261 A | * | 5/1998 | Wiedeman | 455/13.1 |
| 5,845,206 A | * | 12/1998 | Castiel et al. | 342/356 |
| 5,867,783 A | * | 2/1999 | Horstein et al. | 455/12.1 |
| 5,871,181 A | * | 2/1999 | Mass | 244/158 R |
| 5,896,558 A | * | 4/1999 | Wiedeman | 455/12.1 |
| 5,918,157 A | * | 6/1999 | Wiedeman et al. | 370/316 |
| 5,969,669 A | * | 10/1999 | Ishikawa et al. | 342/357.02 |
| 5,971,324 A | * | 10/1999 | Williams et al. | 244/158 R |
| 5,979,832 A | * | 11/1999 | Draim | 244/158 R |
| 6,019,318 A | * | 2/2000 | Cellier et al. | 244/158 R |
| 6,021,309 A | * | 2/2000 | Sherman et al. | 455/12.1 |
| 6,040,798 A | * | 3/2000 | Kinal et al. | 342/352 |
| 6,058,307 A | * | 5/2000 | Garner | 455/12.1 |
| 6,059,233 A | * | 5/2000 | Koppel et al. | 244/158 R |
| 6,126,116 A | * | 10/2000 | Cellier | 244/158 R |
| 6,160,994 A | * | 12/2000 | Wiedeman | 244/158 R |
| 6,243,580 B1 | * | 6/2001 | Garner | 455/12.1 |
| 6,257,526 B1 | * | 7/2001 | Taormina et al. | 244/158 R |
| 6,325,332 B1 | * | 12/2001 | Cellier et al. | 244/158 R |
| 6,327,523 B2 | * | 12/2001 | Cellier | 244/158 R |

OTHER PUBLICATIONS

Roger, Rusch; "The Maret and Proposed Systems for Satellite Communications"; Fall 1995, Applied Microwave & Wireless, pp. 10–34.*

* cited by examiner

*Primary Examiner*—Charles T. Jordan
*Assistant Examiner*—Stephen A Holzen
(74) *Attorney, Agent, or Firm*—John C. Hammar

(57) ABSTRACT

Boeing achieves satellite diversity by having a large discrimination angle for a MEO constellation of communications satellites to limit interference in the Ku-band with GSO communications systems. Each satellite entering an exclusion zone over a GSO ground station terminates all transmissions to provide EPFD within acceptable limits. The Boeing MEO constellation preferably comprises 20 satellites, 5 in each orbit. The four orbits are inclined at about 57° with respect to the equator. Services include an Integrated Digital Service (IDS) and Backhaul Data Service (BDS) to accommodate the needs of different users.

8 Claims, 10 Drawing Sheets

- — 0.6 m
- ⋯ 3.0 m
- – – 10 m

- — 30 cm
- ⋯ 60 cm
- – – 90 cm

- 45 cm
- 1.0 m
- 1.2 m
- 1.8 m

METHOD FOR LIMITING INTERFERENCE BETWEEN SATELLITE COMMUNICATIONS SYSTEMS

REFERENCE TO RELATED APPLICATION

The present application claims the benefit of U.S. Provisional Patent Application No. 60/174,873, filed Jan. 7, 2000.

TECHNICAL FIELD

The present invention relates to telecommunications and, particularly, to operation of a medium earth orbit (MEO) satellite constellations for voice, video, and/or data communication, generally broadband, in the Ku-band of the frequency spectrum. More specifically, the present invention relates to interference mitigation techniques for sharing of spectrum between two competing communications systems. Typically, one system uses one or more satellites positioned in a geosynchronous orbit (GEO or GSO), and the other uses an array of satellites orbiting in non-geosynchronous orbits (non-GEO or NGSO).

BACKGROUND ART

The World Radio Conference in 1997 (WRC-97) allocated NGSO satellite systems co-primary status with GSO satellite systems in certain frequency bands based on provisional limits on the Effective Power Flux Density (EPFD) that the NGSO systems produce. Studies continue to refine these EPFD limits to allow the GSO and NGSO systems to operate simultaneously sharing the Ku-band of the frequency spectrum. The interference mitigation technique of the present invention reduces the peak interference levels for the GSO ground station antenna and allows the NGSO system to meet the proposed limits more easily. The technique of the present invention produces interference that is more tolerable to GSO systems than interference produced by the techniques currently planned for use by LEO NGSO satellite systems. Interference that does occur with the technique of the present invention is primarily (if not wholly) outside the "short term interference" band of the EPFD distribution curve. In this "short term interference" band, for example, the interference may be −40 dB below the limit.

A satellite in a geostationary or geosynchronous orbit (GSO) is positioned above the equator at an altitude of about 35,800 km and at an inclination of about 0 degrees. A GSO satellite orbits the earth once per day in synchronous motion with the revolution or rotation of the Earth. The satellite appears fixed in the sky to an observer on the surface of the earth. Communicating with a GSO satellite has some obvious advantages in that an earth station antenna can remain pointed in one stationary and fixed direction without the need for active control to maintain pointing at the GSO satellite. A GSO satellite provides coverage of only a portion of the earth and cannot cover the Polar regions, which are 90° in arc away from the plane of the satellite. Additionally, the round-trip time delay between an earth station and the GSO satellite is relatively large, which can have undesirable effects on communications.

NGSO satellite constellations have been proposed to overcome some of these problems. A constellation of NGSO satellites can provide complete global coverage including the Polar regions, because such NGSO constellations can include satellites at inclination angles other than 0°. Since NGSO satellites are nominally at a lower orbit altitude, the round-trip time delay will be lower.

One of the early NGSO orbit constellations proposed for spectrum sharing with GSO satellite systems was a Low Earth Orbit (LEO) satellite system of up to 80 satellites. This constellation was called (SkyBridge—USAKUL1). By its nature, a LEO NGSO satellite will spend a significant amount of its orbit period in-line between a GSO satellite and a point on the earth where there might be a GSO earth station. (FIG. 1) The result is that some interference mitigation approach or avoidance technique is required to avoid interference with operation of the existing GSO satellite network. In the approach adopted by SkyBridge, the NGSO satellite turns off only the antenna spot beams that service an area that would be in an alignment condition between a GSO satellite and a GSO earth station. This SkyBridge technique avoids main-beam to main-beam interference and limits the interference to the GSO earth station receiver. A disadvantage of the SkyBridge technique is that satellite antenna spot-beams that are not serving the affected area would still be operating, and sidelobes from these spot-beams could cause significant interference to the GSO earth stations, particularly for earth stations with large antenna apertures. Such interference would be relatively significant, especially in the "short term interference" band, and would be disruptive to the GSO communication system.

The Ellipso system proposed a Highly Eccentric Orbit (HEO). While the orbits proposed for SkyBridge is circular, and the satellite is always at the same altitude above the earth, a HEO orbit would use an eccentric ellipse having the center of the Earth as one foci of the ellipse. As a result the satellite altitude varies significantly over its orbit. For orbit stability, a HEO satellite operates at a high inclination, and the satellite only communicates during the high altitude portion of the orbit. As a result of the typical operating characteristics of the HEO orbit, there is a large discrimination angle between the HEO satellite and a GSO satellite. No in-line condition occurs (NGSO satellite in-line with a GSO satellite and a GSO earth station), which significantly reduces the peak interference into any of the GSO earth stations. The Ellipso system is more completely described in U.S. Pat. Nos. 5,669,585; 5,788,187; 5,845,206; and 5,979,832, which I incorporate by reference.

Individual satellites of a HEO satellite constellation are only operating during a portion of their orbit, increasing the number of satellites required to provide continuous communication coverage. The additional satellites impose significantly higher start-up and capital costs for the system. A Molniya HEO orbit, for example, requires three satellites. Each operates for only 8-hours of the orbit to provide 24-hour coverage. HEO satellites also transit the Van Allen radiation belts continuously. The satellite therefore has to be radiation hardened, making it more costly. The transit through this intense radiation lowers the expected lifetime for each satellite. Because the satellite altitude is constantly changing during its operating period, the service area covered by a typical satellite reflector antenna will also constantly change unless active beam pointing and beam width control is used. Adding beam pointing and beam width control systems to each satellite requires a more complex and costly antenna control system.

The system Ellipso described in U.S. Pat. No. 5,979,832 involves an array of satellites that looks like a planetary gear system. The satellites are in low to medium earth orbit (LEO to MEO) in two interactive orbital rings. An outer ring contains circular orbit satellites. An inner ring contains elliptical orbit satellites. The apogees of the elliptical orbits are approximately tangential to the diameter of the circular earth orbits. The periods of the two rings are adjusted to be proportional to the numerical ratio of the number of satellites in one ring with that of the other. The adjustment allows the elliptical inner ring of satellites to be spaced always midway between the satellites (or "teeth") of the outer ring for a specified parameter. This spacing can be tailored to a specific point on the earth or to a given time of day. The spacing between satellites in the "planet gear" constellation will be approximately equal anywhere in the populated world during daytime hours. Nighttime coverage is likely less critical since fewer people will be using resources at night—more people are sleeping. Hence, the circular satellites are presumed to be capable of handling the nighttime traffic alone, without involving the elliptical satellites. The fact that the inner elliptic ring of satellites overtake and pass the outer circular ring of satellites on the nighttime side of the earth is thus not a cause for serious concern, provided that the assumption of a decline in load actually occurs. If messages are stored and transmitted prefecentially at "off-peak" hours, the relative amplitudes of the peaks and troughs in usage, however, would be reduced and load might approach a steady state. This HEO system might encounter problems with a steady state pattern of use.

"Apogee pointing toward the sun" (APTS) satellites useful in the Ellipso elliptical orbits are described in U.S. Pat. No. 5,582,367, which I also incorporate by reference.

A Medium Earth Orbit (MEO) constellation of the present invention can provide the advantages of the HEO system (large discrimination angles) in reducing the overall interference to the GSO satellite networks without the disadvantages of the HEO system. The interference to the GSO satellite networks can be significantly reduced over that produced by the LEO systems without the inefficiencies (i.e., need for a larger number of satellites), complexity, or cost of the HEO systems.

A MEO satellite system is described in U.S. Pat. Nos. 5,433,726; 5,439,190; 5,551,624; and 5,867,783, which I incorporate by reference. Such a system would be able to provide complete global coverage, including the Polar regions, which the GSO satellite networks cannot do.

A MEO/GSO satellite system is described in U.S. Pat. No. 5,971,324, which I also incorporate by reference.

U.S. Pat. No. 6,011,951 describes an interference avoidance technique for two Teledesic LEO constellations sharing a common radio frequency band. A first and a second satellite communication system each contain a plurality of satellites in a plurality of non-geostationary (NGSO) Earth orbits. Each of the plurality of NGSO satellites has a predefined orbital plane. Within each orbital plane, satellites of the first and second satellite communication systems are alternating, such that each orbital plane contains one or more satellites from both of the satellite systems. In this manner, it is possible to achieve satisfactory discrimination between satellites and Earth-based stations. The Earth-based station of each communication system will communicate with the closest satellite of its respective communication system. In an alternative technique that is particularly useful when an Earth-based station in the first communication system is able to communicate with more than one satellite, a satellite is selected based on the topocentric separation of the satellite from satellites in the second system. The system can also combine alternating satellites within an orbital plane with alternating orbital planes with satellites of each respective communication system.

A need remains for a technique to limit interference between a MEO constellation and a GSO system. The present invention provides such a technique.

A need also remains for a low-cost, reliable satellite architecture suitable for use in a MEO system provide global communication coverage to and from mobile platforms, such as airplanes, trains, ships, or automobiles. Such a satellite constellation would allow access to the Internet, for example, to a global population with increasing frequency to be "on the move."

These and other features of the present invention will now be described in the Summary and Detailed Description.

SUMMARY OF THE INVENTION

The preferred Boeing MEO satellite constellation communication system includes 20 satellites, preferably at an altitude of about 20,182 km. The system consists of four planes inclined 57° relative to the equator, with each plane containing five satellites. The use of a MEO constellation enables the Boeing system to provide truly global coverage while minimizing the number of spacecraft and, as a result, lowering the costs for Boeing's customers. The constellation permits users outside the Tropics to always be in view of at least two operational satellites above a 30° elevation angle. Customers within 23° of the equator will be in view of at least two satellites above a 30° elevation at least 73 percent of the time. In addition, each satellite will always be visible to at least two gateways (i.e., an NG50 Earth station) of the Boeing system. The number of satellites is a design choice in large measure, but designs usually seek to minimize the number of satellites because they are expensive to build, launch and maintain. The Boeing system is designed to provide "bandwidth on demand" ("BOD") communication and data services. To accommodate the unique data transmission needs of professional, institutional and governmental users, the system includes two types of transmission schemes: Integrated Digital Service ("IDS") and Backhaul Data Service ("BDS"). The Boeing system may provide ancillary broadband communication services to user terminals affixed to mobile platforms, such as aircraft, ships, or motor vehicles.

To ensure seamless handoffs between gateways, each Boeing satellite will have two sets of feeder link antennas, receivers and transmitters. Feeder link antennas will independently track different gateway locations. Approximately twelve gateways will be used around the world to provide connectivity between the Boeing system and the terrestrial communications infrastructure.

The Boeing system employs an interference mitigation technique that eliminates main-beam to main-beam interference. Neither the satellites nor associated earth stations will transmit when the Boeing satellites are within 15° latitude of the equator. When the Boeing satellites enter the exclusion zone, traffic is switched to a Boeing satellite that is not within the exclusion zone.

The spacecraft antennas include two feeder link antennas, seven forward service link antennas and one return service link antenna for the IDS; along with transmit and receive multi-beam phased array antennas for the BDS and an Earth-coverage beacon antenna.

The flexibility and reliability of Boeing's dual BOD transmission schemes will be able to accommodate a wide variety of professional, institutional and governmental uses. A sampling of potential applications include:

Corporate networking for dispersed corporate offices where a number of people in individual in-house networks are tied together in a wide area mesh network.

Banking and commercial transactions, where documents, contracts and databases need to be exchanged with substantial accuracy and in a secure mode.

Distance learning for corporate training, specialized education and professional seminars.

Medical applications include the exchange of data, X-ray images, CAT scan data and EKG traces.

Publishing, where designers, artists and customers must exchange high-resolution color images—both fixed and moving.

Entertainment, where high-resolution audio and video material must be backhauled to a central production and redistribution facility.

Remote mining and exploration activities, where geological sampling data needs to be transmitted back to a central location for analysis.

DETAILED DESCRIPTION

1. Interference Avoidance

Figure 2:
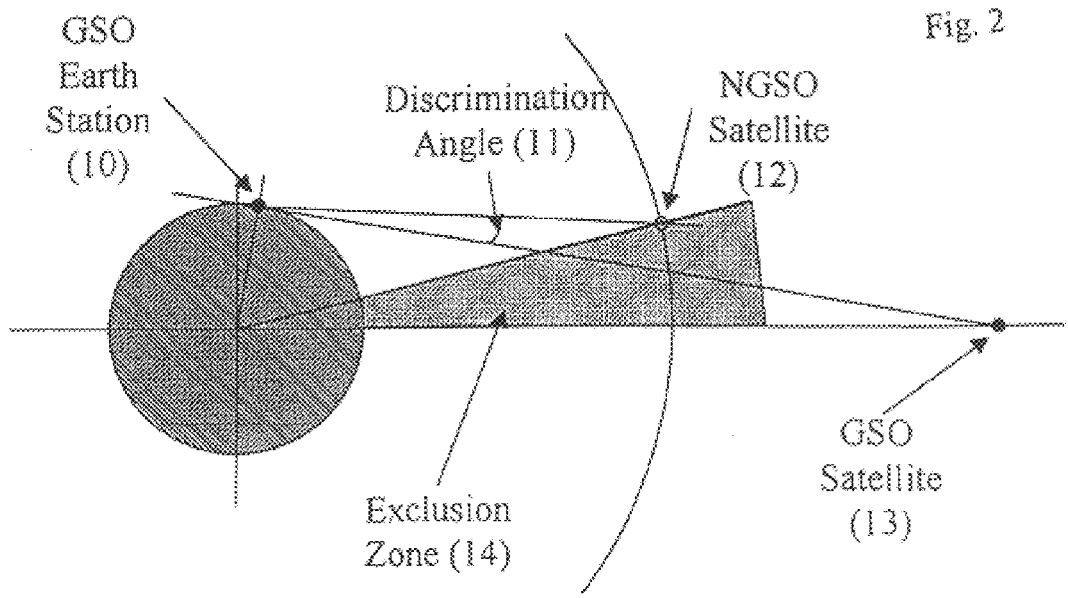
FIG. 2 is a schematic showing a preferred interference avoidance technique of the present invention.

In a preferred embodiment, an NGSO satellite 12 (FIG.2) operates at an altitude of about 20,000 km. Obviously, a satellite at lower or higher altitudes could also work with the inventive method, but MEO is the preferred altitude with a lower practical limit likely of about 10,000 km. LEO places the satellites too close to the earth. The exclusion angle becomes large to achieve satellite diversity (as much as 80%) so the constellation requires an impractical, large number of satellites. The interference avoidance technique of the present invention involves satellite diversity. To minimize the interference to a GSO satellite system consisting of a GSO earth station 10 and a GSO satellite 13, the NGSO satellite 12 turns off all transmissions when it enters an exclusion zone 14 around the equator. In the present implementation of the invention, the exclusion zone is ±15 degrees latitude. Coverage of areas within the exclusion zone is accomplished by handing of the communication to another NGSO satellite outside of the exclusion zone.

Defining the exclusion zone of ±15° latitude permits a practical system with a relatively small number of satellites. Boeing's constellation preferably uses 5 satellites in each of four inclined orbits to provide worldwide communications coverage. IF the exclusion angle were adjusted to ±5° latitude, larger ground station antennas would be required, and we believe they would be impractical, especially for being carried on mobile platforms. At an exclusion zone of ±10° latitude, a reasonable, practical system can be designed. At exclusion angles higher than 15°, the discrimination angle increases, but the spot coverage for the satellite decreases, thereby forcing the use of more satellites. We do not believe that there is an advantage to defining an exclusion zone with an exclusion angle greater than ±15° latitude, unless EPFD limits are tightened further to force greater discrimination between the competing, frequency sharing NGSO and GSO systems.

GSO receiving antennas for ground stations are improving their directional characteristics so that their receiving performance is tightening and improving. Therefore, the interference limits are likely to relax rather than tighten in the future. An optimized NGSO system will operate at the EPFD limits (or slightly below) for acceptable interference because doing so will minimize total system costs.

There are four interference scenarios that must be considered to determine the overall interference levels NGSO satellite 12 produce or introduce into a GSO earth station 10:

interference from the main-beam of the NGSO satellite 12 antennas into the main-beam of the GSO earth station 10 receiver (main-beam to main-beam interference), interference from the main-beam of the NGSO satellite 12 antennas into the sidelobe of the GSO earth station 10 receiver (main-beam to sidelobe interference), interference from the sidelobe of the NGSO satellite 12 antennas into the main-beam of the GSO earth station 10 receiver (sidelobe to main-beam interference) and interference from the sidelobe of the NGSO satellite 12 antennas into the sidelobe of the GSO earth station 10 receiver (sidelobe to sidelobe interference).

By not transmitting when in the exclusion zone 14, the NGSO satellite 12 never operates in the GSO earth station 10 antenna main beam to avoid the conditions of main-beam to main-beam interference and sidelobe to mainbeam interference. While a LEO satellite system avoids main-beam to main-beam interference, it does have sidelobe to main-beam interference. It is the sidelobe to main-beam interference that can produce high peak interference powers to the GSO earth station 10 receiver, particularly for large GSO earth station 10 antennas. The SkyBridge interference avoidance technique allows sidelobe to main-beam interference. The present invention avoids these large peak interference powers by avoiding the sidelobe to main-beam interference condition.

Figure 3:
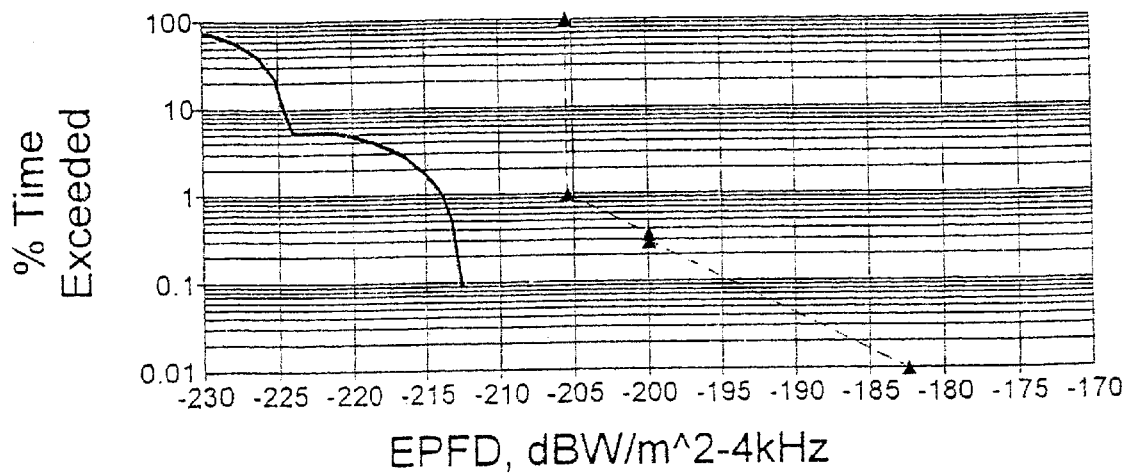
FIG. 3 is a plot showing the anticipated performance (% time exceeded v. EPFD) of a system implementing the technique shown in FIG. 2.
Figure 4:
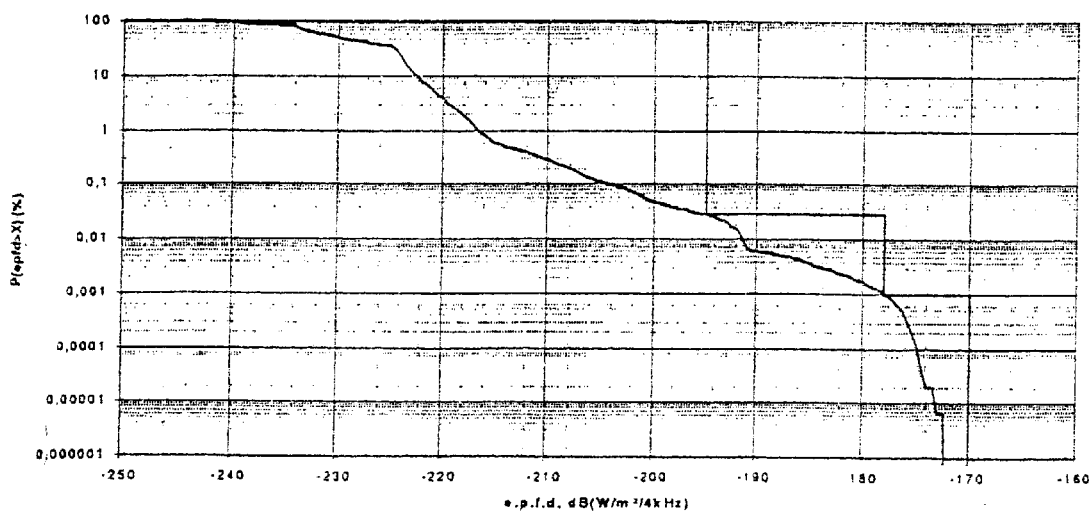
FIG. 4 is a plot showing the anticipated performance (% time exceeded v. EPFD) for a system, such as the SkyBridge system, not using the technique shown in FIG. 2.

FIG. 3 shows a plot of the percentage of time a given EPFD level is exceeded for Boeing's proposed NGSO system using the interference mitigation approach of the present invention. This plot is a result of a simulation performed for the interference from an NGSO satellite constellation into a GSO earth station with a 10-meter diameter antenna. FIG. 4 is a similar plot for the SkyBridge LEO satellite system which does not use the Boeing's interference mitigation approach. As can be seen the interference produced into large GSO earth station antennas is much lower for the Boeing approach, making it more acceptable to the current GSO satellite operators.

Figure 1:
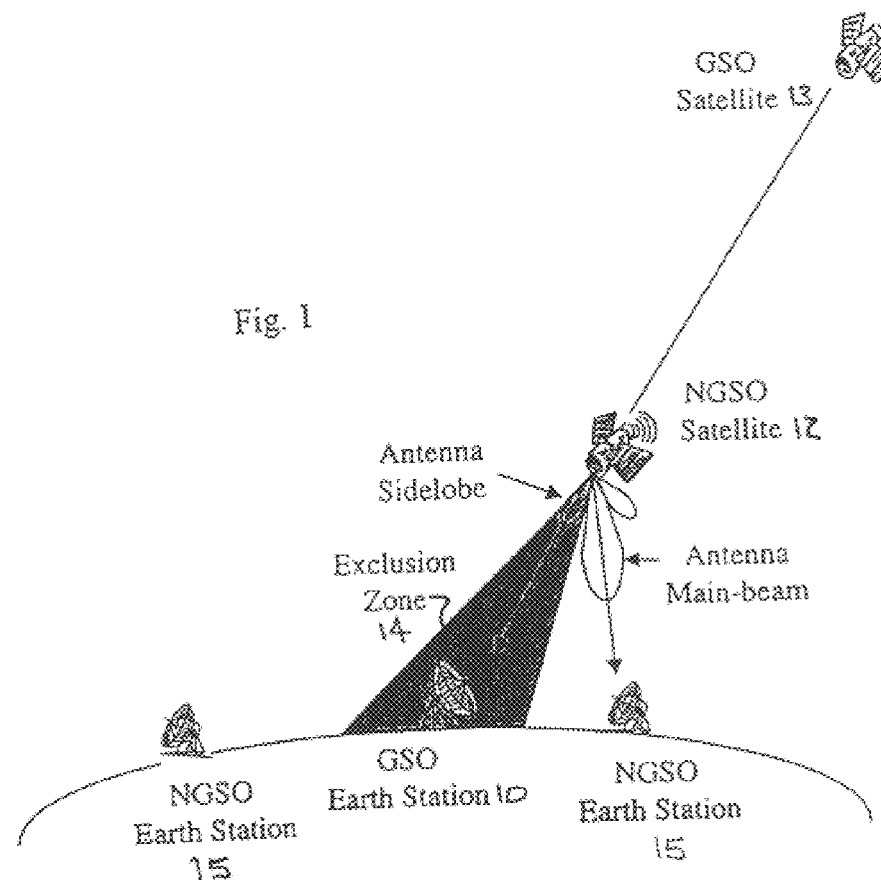
FIG. 1 is a schematic showing typical interference from an NGSO satellite flying over a GSO earth station.

The Boeing system employs an interference mitigation approach that essentially eliminates main-beam to main-beam interference. The Boeing system satellites preferably are in circular oribits at a MEO altitude of about 20,182 kilometers. Neither the satellites nor associated NGSO earth stations or gateways (FIG. 1) will transmit when the satellites are within 15° latitude of the equator. When the Boeing satellites enter the exclusion zone, traffic is switched to a Boeing satellite that is not within the exclusion zone.

The earth station has a minimum discrimination angle of at least 10° between GSO satellites and all Boeing NGSO satellites—illustrating the fact that main-beam to main-beam events never occur with the Boeing system. The earth station's location—about 76.3°—in our analysis was selected because it represents the "worst case" location for a GSO earth station operating pursuant to the Commission's 5° elevation angle requirement.

The worst case geometry occurs when an earth station, a GSO satellite and a NGSO satellite all operate at the same longitude. This is the basic conservative geometric configuration used throughout our interference analysis. Wit the Boeing NGSO satellite at the edge of the exclusion zone (15° latitude), and the GSO earth station at 76.5° latitude operating with a minimum elevation angle of 5°, the discrimination angle between the GSO satellite and the Boeing NGSO satellite is 10°. Furthermore, a GSO earth station at a higher latitude is operating at a lower elevation angle than 5° would still never be subject to main-beam to main-beam events with Boeing's preferred arrangement of NGSO satellites.

In all other realistic scenarios, an earth station communicating with a GSO satellite will have a larger discrimination angle between the GSO arc and any operating Boeing satellite. There is no point on Earth where a GSO earth station antenna would have a transmitting Boeing system satellite in its main-beam and no point on Earth where a Boeing system NGSO earth station antenna would have a GSO satellite in its main beam. In other words, because of Boeing's use of a MEO constellation and a 15° latitude equatorial exclusion zone, 'main-beam to main-beam' and 'sidelobe to main-beam' interference scenarios do not occur with respect to space-to-Earth transmissions from the Boeing system into GSO earth stations. At the same time, the 'main-beam to main-beam' and 'main-beam to sidelobe' interference scenarios do not occur with respect to Earth-to-space transmissions from Boeing earth stations into GSO satellites.

In WRC-97 Resolutions 130 and 538, provisional limits were provided for NGSO transmissions in the space-to-Earth direction to protect GSO networks. One of the limits is stated as an Effective Power Flux Density (EPFD), which is defined as:

$$EPFD = 10 \cdot \text{Log}\left[\sum_{i=1}^{N} 10^{pfd_i/10} \cdot \frac{G_r(\theta_i)}{G_{max}}\right]$$

The provisional EPFD long-term and short-term limits included in Resolutions 130 and 538 are provided in Table 1.

TABLE 1

EPFD Limits from Resolutions 130 and 538

| Frequency Band | EPFD DBW/ $m^2$- 4 kHz | Time Per- centage | Reference Antenna |
|---|---|---|---|
| FSS Bands | −179 | 99.7 | 60 cm, Rec. 465-5 |
| 10.7–11.7 GHz | −192 | 99.9 | 3 m, Rec. 465-5 |
| 11.7–12.2 GHz in Region 2 | −186 | 99.97 | 3 m, Rec. 465-5 |
| | −195 | 99.97 | 10 m Rec. 465-5 |
| 12.2–12.5 GHz in Region 3 | −170 | 99.999 | 60 cm, Rec. 465-5 |
| | −173 | 99.999 | 3 m, Rec. 465-5 |
| 12.5–12.75 GHz in Regions 1 & 3 | −178 | 99.999 | 10 m, Rec. 465-5 |
| | −170 | 100 | ≧60 cm Rec. 465-5 |
| BSS Bands 11.7–12.5 GHz in Region 1 | −172.3 | 99.7 | 30 cm, BO-1213 |
| | −183.3 | 99.7 | 60 cm, BO-1213 |
| | −186.8 | 99.7 | 90 cm, BO-1213 |
| 11.7–12.2 GHz & 12.5–12.75 GHz in Region 3 | −169.3 | 100 | 30 cm, BO-1213 |
| | −170.3 | 100 | 60 cm, BO-1213 |
| | | | 90 cm, BO-1213 |
| BSS Bands 12.2–12.7 GHz in Region 2 | −174.3 | 99.7 | 45 cm, App. 30 Annex 5 |
| | −186.3 | 99.7 | 1 m, App. 30 Annex 5 |
| | −187.9 | 99.7 | 1.2 m, App. 30 Annex 5 |
| | −191.4 | 99.7 | 1.8 m, App. 30 Annex 5 |
| | −165.3 | 100 | 45 cm, App. 30 Annex 5 |
| | −170.3 | 100 | 1 m, App. 30 Annex 5 |
| | | | 1.2 m, App. 30 Annex 5 |
| | | | 1.8 m, App. 30 Annex 5 |

To determine the EPFD for a NGSO system, the following variables must be provided: (1) the discrimination angle of the GSO earth station receive antenna, (2) the sidelobe reference pattern of the GSO earth station receive antenna and (3) the power flux density (PFD) from the NGSO satellite.

Figure 5:
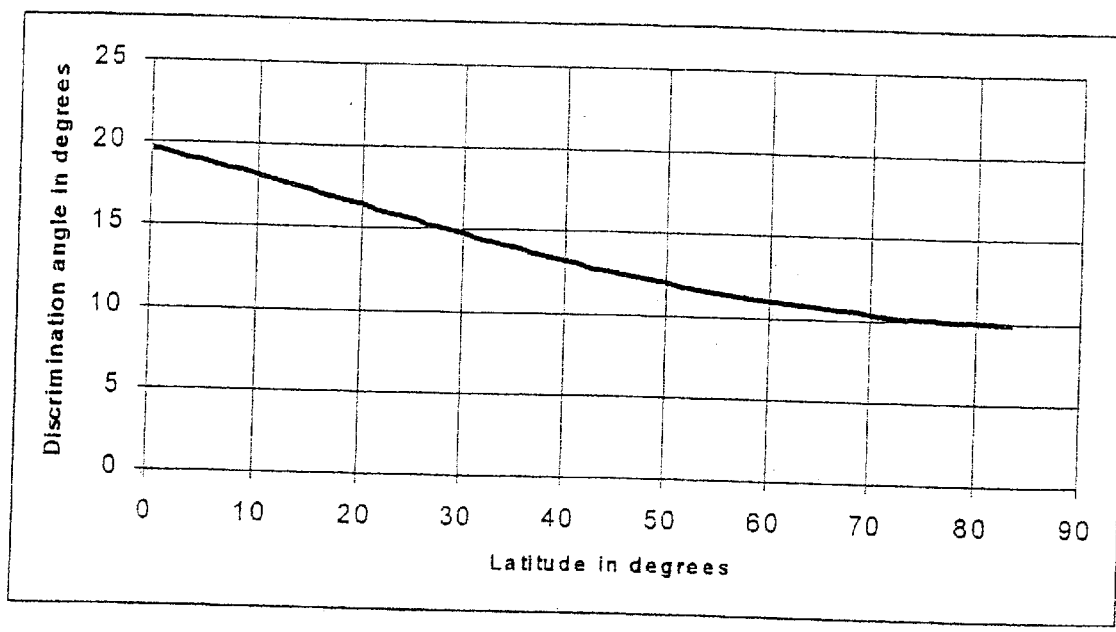
FIG. 5 is a plot showing the discrimination angle as a function of the assumed latitude of the GSO earth station.

The first factor in determining the EPFD for a NGSO system is the discrimination angle of the GSO earth station receive antenna. This discrimination angle is the angle from the boresight of the GSO antenna (pointed toward the GSO satellite) to the direction of the interfering Boeing system satellite. FIG. 5 shows a plot of the discrimination angle as a function of the assumed latitude of the GSO earth station. This plot assumes that the GSO earth station, the GSO satellite and the Boeing satellite are at the same longitude and that the Boeing satellite is at a latitude of 15° (at the edge of the exclusion zone). As the Boeing system satellite moves further north, away from the exclusion zone, the discrimination angle will increase and the EPFD at the GSO earth station will decrease.

Figure 6:
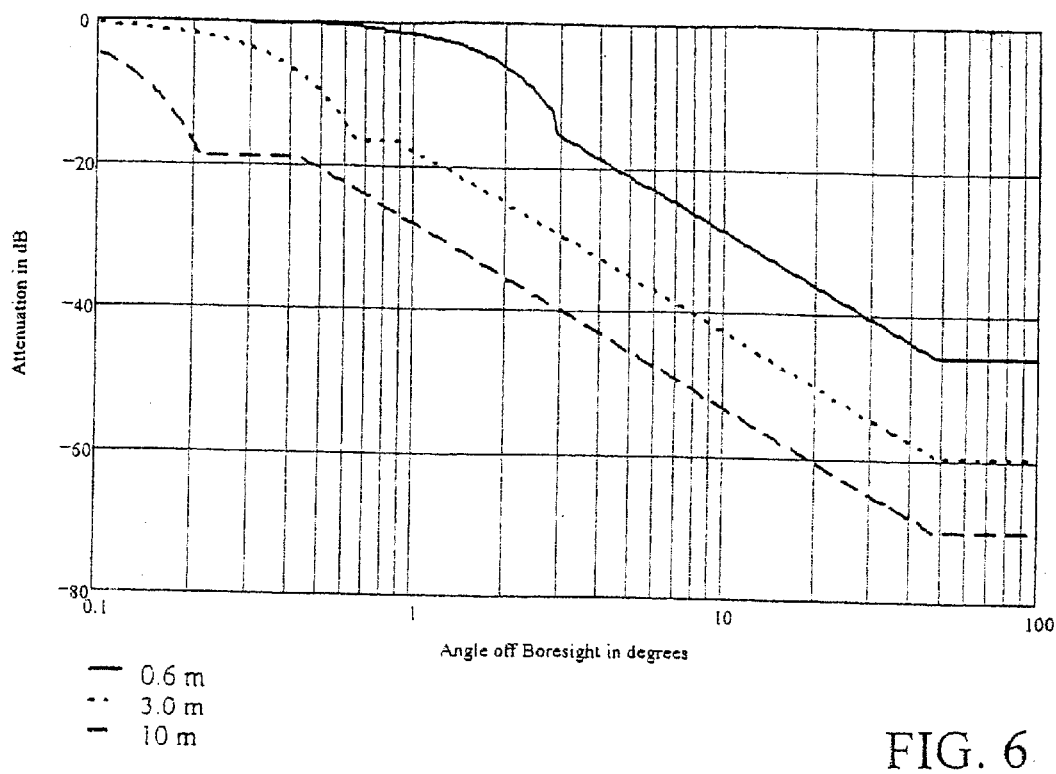
FIG. 6 is a plot showing sidelobe discrimination pattern as a function of angle for a reference antenna.
Figure 7:
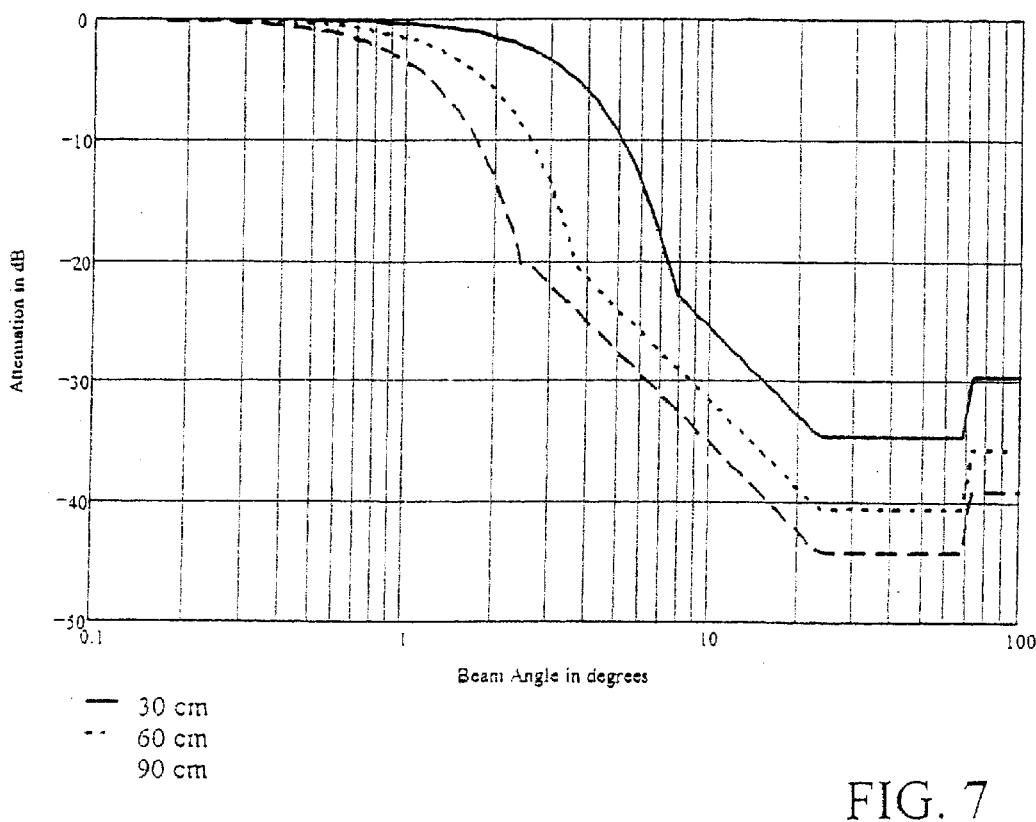
FIG. 7 shows another sidelobe discrimination pattern, similar to FIG. 6, for a reference antenna.
Figure 8:
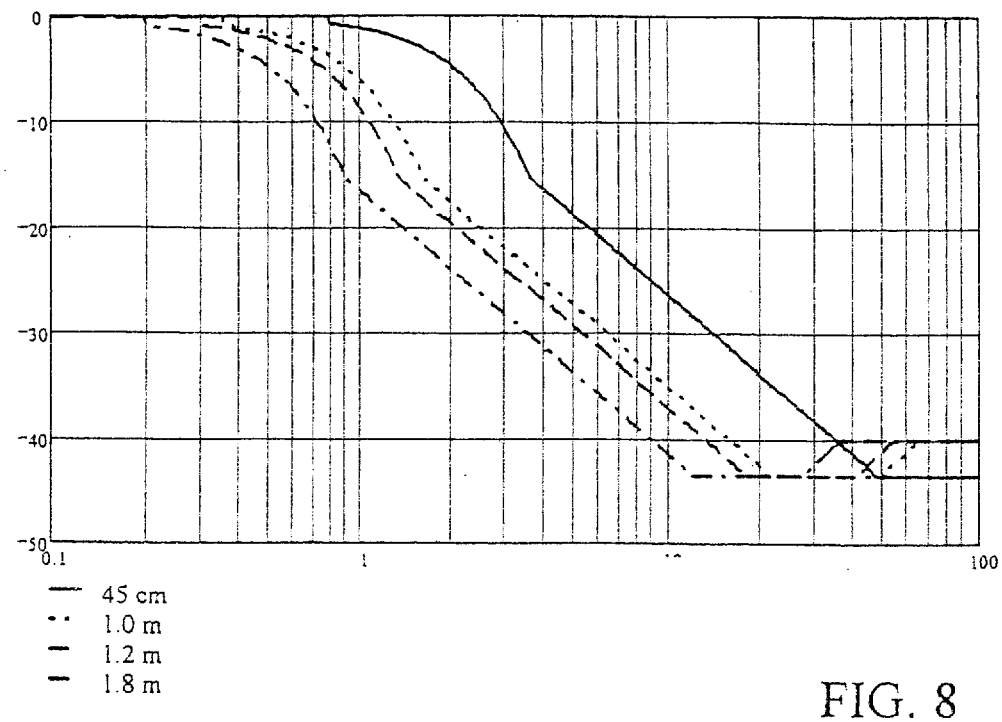
FIG. 8 shows yet another sidelobe discrimination pattern for another reference antenna.

The second factor in computing the EPFD for a NGSO is the sidelobe reference pattern for the receive antenna of GSO earth station. As indicated in Resolution 130, the reference pattern used for the FSS bands is in ITU-R Recommendation 5.1428. FIG. 6 is a plot of the sidelobe discrimination as a function of angle for the three antenna sizes included in Resolution 130. FIG. 7 shows the sidelobe discrimination pattern for the reference BSS antennas of ITU-R Recommendation BO-1443. FIG. 8 shows the sidelobe discrimination pattern for the reference BSS antenna patterns in Radio Regulation Appendix S30, Annex 5 used in Region 2.

The final factor in determining the EPFD for a NGSO system is the actual PFD from the NGSO satellites. Boeing is providing two different data transmission services to users, IDS and BDS. The two services have different space-to-Earth transmission characteristics and, as a result, produce different PFD and EPFD levels. Accordingly, the PFD and EPFD levels for each service are considered separately.

Figure 9:
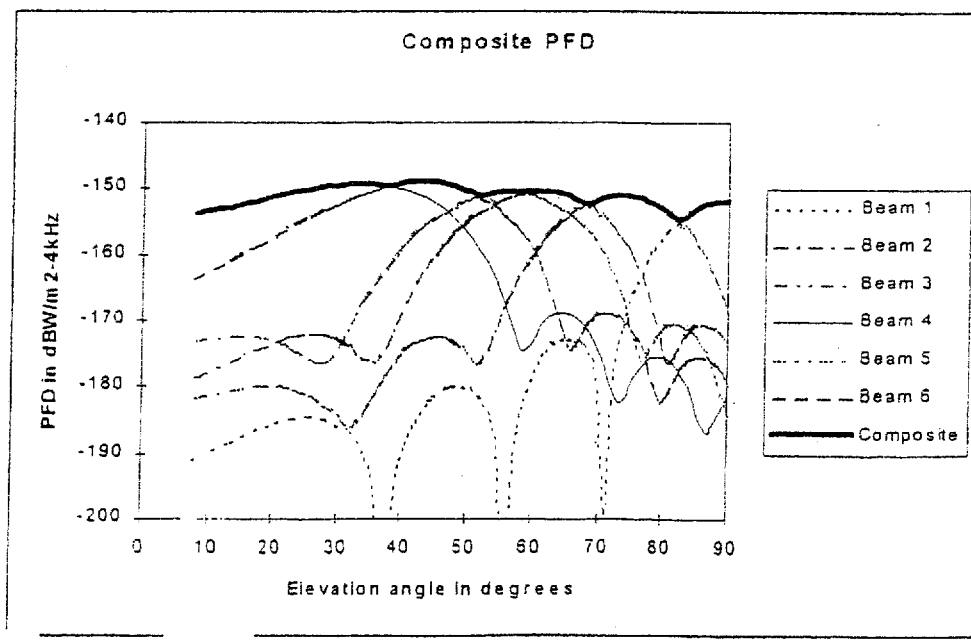
FIG. 9 is a plot of power flux density as a function of elevation angle.

Each Boeing satellite will be capable of producing 37 spot beams for IDS space-to-Earth links. Each of the beams will have a different EIRP and different pointing angle. Consequently, each beam will produce a different PFD. FIG. 9 is a composite plot of the PFD produced by each of the co-frequency beams from the Boeing satellite as a function of elevation angle. As adjacent beams use different frequency bands, the composite shows the maximum value of a single sub-band across all the beams.

Spot beams from the Boeing system constellation are controlled so that under normal conditions a spot beam will serve a ground area from only one satellite. Where the co-frequency beams of two or more satellites completely overlap, the spot beam from only one of the satellites will normally be operational. The general metric for determining which spot-beams will be on or off is based on which provides the best (i.e., the highest) elevation angle. The use of a higher elevation angle will also minimize interference into other systems.

At the edges of coverage between two satellites, it is possible to have two spot beams of the same frequency with partial overlapping footprints. At the worst case, with two co-frequency spot beams completely overlapping, the PFD would be 3 dB higher than a single spot beam for the duration of the overlap at the particular ground location. Only one satellite at a time, however, will be anywhere near the worst case geometry. The second satellite with the overlapping spot beam will be at a significantly greater discrimination angle and, as a result, it will not have a significant impact on the EPFD level.

Figure 10:
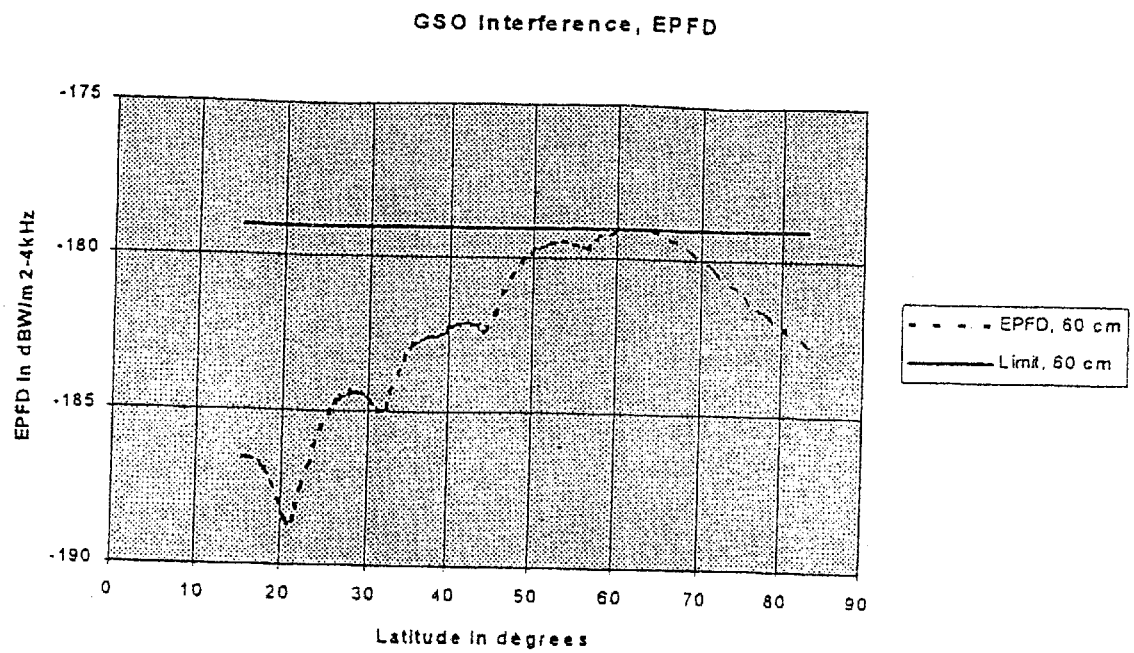
FIG. 10 is a plot of the "worst case" EPFD for a reference antenna.

The three variables—satellite PFD, discrimination angle, and reference antenna pattern—can be combined to determine an unrealistic, worst case EPFD that theoretically might be produced by Boeing's IDS transmissions. FIG. 10 is a plot of this unrealistic, worst case EPFD produced by a single Boeing satellite for the ITU-R Recommendation 5.1428,60-cm antenna. The EPFD for a Boeing satellite at the edge of the exclusion zone is plotted against the latitude of the GSO earth station. For reference, the long-term provisional limit is also plotted. A Boeing satellite providing IDS in Boeing's preferred system will meet or be below the provisional long-term limit for the Rec. 5.1428,60-cm antenna. Since the provisional short-term limits include a higher EPFD value than the long term limits, satisfying the long-term EPFD limit 100 percent of the time, by definition, satisfies the short-term EPFD limit.

This "worst case" will not occur under any normal operating condition. The worst case condition is unrealistic because it assumes that all the spot beams for a Boeing satellite are turned on and that no other satellite in the constellation provides coverage of any area being covered by the single satellite. Under normal conditions the area of the high latitude test point at which the worst case EPFD occurs would not be served by such a satellite in the worst case geometry. Instead, another satellite in the constellation at a much higher elevation angle (and thus at a higher discrimination angle) would serve the high latitude test point, resulting in a much lower EPFD. Therefore the Boeing system will meet the requirements to avoid interference with the GSO system during all normal operating scenarios.

To determine the expected EPFD under normal operating conditions, simulations of the interference conditions between the operational Boeing system and a reference GSO system have been conducted. The simulations were done using the Visualyse software package. A list of the pertinent simulation parameters is provided in Table 2. A number of locations for GSO earth stations were tested to determine the worst case location. As expected, the worst case location is where the GSO earth station is at the same longitude as the GSO satellite, and the NGSO satellite with a descending node that is just slightly east of that same longitude.

TABLE 2

Simulation Parameters

| | |
|---|---|
| GSO Satellite Location | 97° W |
| Worst-case Test Point Location | 97° W, 50° N |
| NGSO Satellite Locations | As defined in Table 6.2-1 |
| NGSO Terminal Location | 97° W, 47° N |
| Simulation Duration | 24 hours (orbit repeat period) |
| Simulation Step-size | 15 seconds |

Table 3 is a summary of the results of the simulations. The Table also lists the provisional long-term limit for each antenna configuration in Resolutions 130 and 538. It also provides the maximum value of the EPFD that was determined from the simulations. The EPFD produced by the Boeing system is below the provisional long-term limit in all cases. Accordingly, the Boeing system also meets the less restrictive short-term limit 100 percent of the time.

TABLE 3

EPFD Simulation Results

| Band | Reference Antenna | Limit (Long-Term) | Simulation EPFD (Maximum) |
|---|---|---|---|
| FSS | 60 cm, Rec. 465-5 | −179 | −184.3 |
| | 3 m, Rec. 465-5 | −192 | −198.3 |
| | 10 m, Rec. 465-5 | −195 | −208.8 |
| BSS | 30 cm, BO.1213 | −172.3 | −181.6 |
| | 60 cm, BO.1213 | −183.8 | −187.6 |
| | 90 cm, BO.1213 | −186.8 | −191.1 |
| BSS | 45 cm, App 30 Annex 5 | −174.3 | −180.3 |
| | 1.0 m, App 30 Annex 5 | −186.3 | −188.9 |
| | 1.2 m, App 30 Annex 5 | −187.9 | −190.9 |
| | 1.8 m, App 30 Annex 5 | −191.4 | −192.5 |

The Boeing BDS uses the same exclusion zone as the IDS to eliminate main-beam to main-beam interference. The BDS uses operational constraints to mitigate other forms of interference. The BDS steerable beams are controlled so that co-frequency beams of two or more satellites do not overlap on any area of the Earth.

The results described and shown are representative of the system (simulated) performance as of Jan. 8, 1999. Refinements in the system and changes to the limits since that time have further improved the system. The data presented is representative of the system capabilities rather than necessary attributes of the present invention.

The announced Teledesic system will always point the earth station antennas North (South) and will locate all the earth stations outside and exclusion zone in latitudes between 18° South and 18° North. This technique also will result in a low interference level into the GSO earth stations, but does not provide truly global coverage.

2. Boeing's Ku-band NGSO FSS System Design

Having presented a detailed description of our preferred interference avoidance technique for Boeing's Ku-band NGSO Fixed Satellite Service (FSS) system, I will next provide a general description of the overall system. Further, details are included in Boeing's Ku-band NGSO FSS System Application (for license) to the Federal Communications Commission submitted Jan. 8, 1999, which I incorporate by reference.

The preferred Boeing system includes 20 operational satellites in a MEO constellation, preferably at an altitude of about 20,182 km. The system consists of four planes inclined 57° relative to the equator, with each plane containing five operational satellites (and usually one spare). The use of a MEO constellation enables the Boeing system to provide truly global coverage while minimizing the number of spacecraft and, as a result, lowering the costs for Boeing's customers. The constellation permits users outside the Tropics to always be in view of at least two operational satellites above a 30° elevation angle. Customers within 23° of the equator will be in view of at least two satellites above a 30° elevation at least 73 percent of the time. In addition, each satellite will always be visible to at least two gateways of the Boeing system. The number of satellites is a design choice in large measure, but designs usually seek to minimize the number of satellites because they are expensive to build, launch and maintain.

The system will operate within two GHz bands in the Ku-band for Earth-to-space transmissions and within the one band for space-to-Earth transmissions, requiring about 326 MHz of Earth-to-space service link spectrum and 1000 MHz of space-to-Earth service link spectrum. The Boeing system also requires 600 MHz of spectrum for Earth-to-space feeder link operations and 1000 MHz of spectrum for space-to-Earth feeder link operations.

The Boeing system is designed to provide "bandwidth on demand" ("BOD") communication and data services, primarily to corporate, institutional, governmental and large professional users. The professional BOD market is by far the most rapidly growing segment of the commercial satellite services industry. Expansion in the BOD market is being fueled by the convergence of transmission paths for multiple telecommunications services that were previously provided separately to consumers. For example, a BOD satellite network can provide to professional users a single data stream that can include basic voice telephony, facsimile transmission, video-conferencing, high-speed data transfer for local area networks ("LANs"), Internet access, data broadcasts and other services. By utilizing a single data transmission path for multiple telecommunications services, professional users can significantly lower the cost of information systems, while enjoying the geographic flexibility that can be provided by a global satellite network.

To accommodate the unique data transmission needs of professional, institutional and governmental users, the system includes two types of transmission schemes: Integrated Digital Service ("IDS") and Backhaul Data Service ("BDS"). IDS is the primary transmission scheme. Resembling the structure of an Internet service, IDS provides larger capacity in the forward direction (up to 31.2 Mb/s) and smaller capacity in the return direction (up to 7.37 Mb/s) per beam. Boeing's second service, BDS, is designed primarily to retrieve large amounts of data from remote locations. BDS offers high-speed (up to 120 Mb/s) return link transfer capability and permits modest (24.4 Mb/s) forward link capability.

The Boeing system provides two types of data transmission systems to users in much of the same spectrum. Boeing's BDS forward service links will operate in the same spectrum as its IDS forward service links. Similarly, Boeing's BDS return feeder links will operate in the same spectrum as its IDS return feeder links. Thus, Boeing will be able to provide multiple data transmission services on a spectrum efficient basis, while serving the customized needs of commercial, governmental, institutional and large professional users.

The Boeing system may provide ancillary broadband communication services to user terminals affixed to mobile platforms, such as aircraft, ships, and motor vehicles. A substantial, currently underserved demand exists for broadband data services aboard mobile platforms. Boeing has developed advanced antenna technology that can provide service to this market without resulting in unacceptable interference to authorized users of the Ku-band.

Boeing's system will also be able to operate co-frequency with FS networks in the Ku-band. When the footprints from two Boeing satellites operating at the same frequency completely overlap, one beam will be shut down to limit the power flux density ("PFD") produced at the Earth's surface. As a result, only one transmit beam from the Boeing system will be covering the ground in most cases. Even when the beams of two satellites partially overlap, the PFD level at that location will still be below the provisional PFD limits adopted by WRC-97.

Finally, Boeing's system will be able to operate co-frequency with other adequately designed NGSO FSS systems. Boeing's system can share spectrum with multiple homogeneous satellite systems. Boeing's system can also share spectrum with a number of inhomogeneous systems if appropriate interference mitigation techniques are adopted by each co-frequency system. For example, satellite diversity could be employed to avoid incidents of 'main-beam to main-beam' interference between satellites in different inhomogeneous NGSO constellations.

Boeing's ability to share spectrum with other Ku-band systems is enhanced by Boeing's choice of a MEO constellation. Boeing's MEO constellation provides superior spectrum sharing capabilities as compared to comparable low Earth orbit ("LEO") systems. The spectrum sharing capabilities of Boeing's satellite system is one of many design characteristics that make the Boeing system a highly efficient and cost effective use of scarce spectrum resources.

The use of the preferred MEO constellation will enable Boeing to provide truly global coverage, while limiting the number of spacecraft. The constellation consists of four planes, each containing five satellites. Each orbital plane is inclined 57° relative to the equator. The constellation permits any user of the Boeing system at latitudes above 23° to always be in view of at least two operational satellites above 30° elevation. Boeing customers between the Tropics will be in view of at least two satellites at least 73 percent of the time.

To ensure seamless handoffs between gateways, each Boeing satellite will have two sets of feeder link antennas, receivers and transmitters. Feeder link antennas will independently track different gateway locations. Approximately twelve gateways will be used around the world to provide connectivity between the Boeing system and the terrestrial communications infrastructure. Gateways will be strategically located so that every Boeing satellite will always be in view of at least two gateways. Additional considerations in the siting of Boeing gateways will include providing a high level of connectivity with terrestrial telecommunications networks and ease of spectrum coordination with co-frequency terrestrial services.

Boeing's service links are designed to communicate with user terminals using dual-circular polarization. Boeing's feeder link transmissions will employ a combination of single polarization and dual-circular polarization transmissions.

2.1 Data Transmission Services

IDS and BDS are structured to operate in a complementary fashion, sharing the same spectrum for forward service links and return feeder links. Boeing's BDS forward service links will operate co-frequency with IDS service links using geographic diversity to avoid intra-system interference. 'Geographical diversity' means that, using electronically steerable transmit antennas, each Boeing satellite will provide BDS transmissions only to users that are located in portions of the satellite's footprint where the IDS service is being provided by another satellite.

Figure 11:
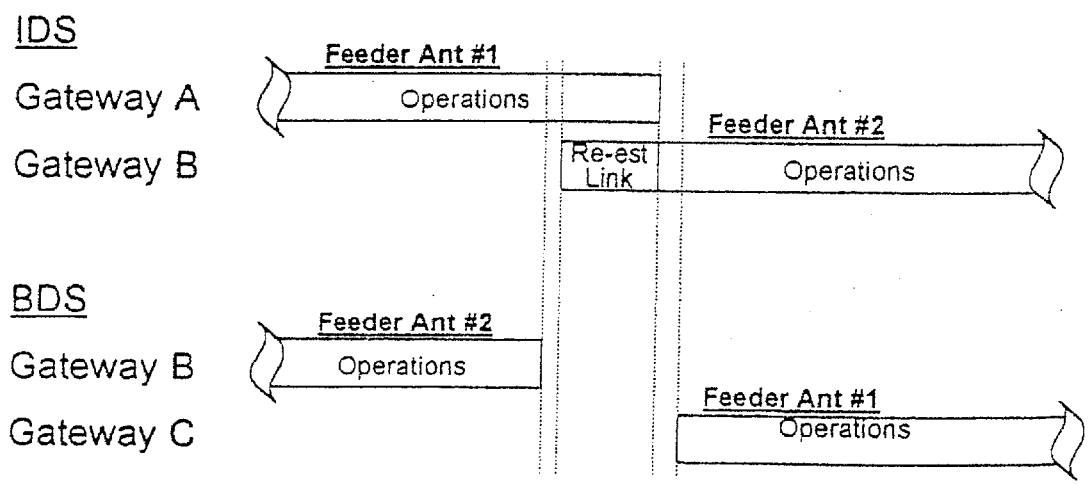
FIG. 11 shows the satellite handoff process.

Boeing's BDS feeder links will operate cooperatively with the IDS feeder links. Each Boeing satellite will have two sets of feeder link transmitters and receivers to perform seamless handoffs between terrestrial gateways. IDS gateway handoffs will operate on a "make-before-break" basis, while BDS handoffs will function using a "break-before-make" method. As shown in FIG. 11, during the handoff process, both sets of feeder link transmitters and receivers will be used cooperatively to execute the handoff between gateways. During the period between gateway handoffs, however, only one set of feeder link transmitters and receivers will be used for the IDS feeder links, making the second set of transmitters and receivers available for BDS feeder link operations.

The flexibility and reliability of Boeing's dual transmission schemes will be able to accommodate the customized needs of a wide variety of professional, institutional and governmental users.

2.2 Integrated Digital Services (IDS)

To provide IDS each Boeing satellite generates a pattern of 37 spot beams to communicate with user terminals. A three-cell frequency reuse pattern is used within the 37-cell spot beam array and dual polarization is used within each spot beam. As a result, Boeing's IDS can have a spectrum reuse factor in excess of 24 within each satellite footprint and in excess of 493 over the full 20-satellite constellation.

The IDS transmit and receive antennas on each satellite use identical spot beam coverage patterns. The IDS beam pattern is nadir pointed and, as a result, the area covered by each satellite beam moves across the Earth as the satellite progresses through its orbit. Due to Boeing's choice of a MEO constellation, the motion of each satellite relative to the Earth is comparatively slow and an IDS user terminal can generally remain in the same beam for about 27 minutes. Beam handoffs are accomplished through ground control. IDS beams from one Boeing satellite that completely overlap IDS beams from another Boeing satellite will be turned off to conserve power and to minimize emissions into co-frequency systems.

The Boeing system will assign user terminals to IDS satellite beams primarily by using whichever beam provides the highest elevation angle. By giving priority to satellite beams at higher elevation angles, Boeing can ensure data transmission quality and minimize emissions into co-frequency FS and GSO FSS/BSS services. Boeing anticipates that after a short period of operation, its user traffic patterns will become predictable, enabling Boeing to pre-determine when beams of each satellite should operate at peak power levels to provide the best service in each coverage area.

Figure 13:
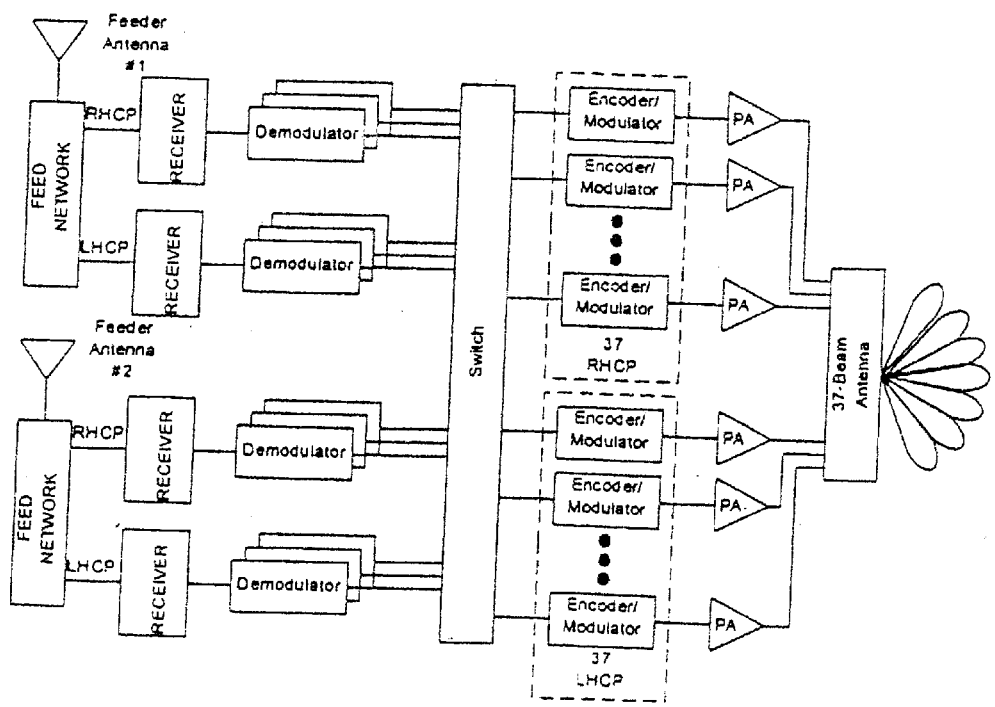
FIG. 13 is a block diagram of the IDS feeder link.

Boeing's IDS power controlled forward feeder links will use a frequency division multiplex/time division multiplex ("FDM/TDM") signal, with each of the FDM channels carrying a 5.2 Mb/s data stream. To provide Boeing's IDS forward service links, each of the forward feeder link FDM data streams will be demodulated on board the satellite. The data stream will then be encoded and re-modulated as a code division multiplex/time division multiplex ("CDM/TDM") signal with a service link bandwidth of 166.7 MHz and routed to the appropriate downlink service transmitters and beams. Depending on traffic requirements, more than one 5.2 Mb/s information stream can be directed to a single beam. (FIG. 13)

The return links employ a transparent bent-pipe transponder. As a result, the signal characteristics of the return service link and return feeder link are the same. The IDS return service link operates as a code division multiple access ("CDMA") channel containing two different signal types. IDS return service link signals can include narrow band (4.8 Kb/s) data streams that are spread spectrum encoded to a bandwidth of 1.25 MHz. These narrow band signals are intended primarily for voice, fax and low rate data transmissions. IDS return service link signals can also include wider band (76.8 Kb/s) data streams that are spread spectrum encoded to a bandwidth of 20 M Boeing's return service link will employ power control from the user terminal, primarily to compensate for rain fade in different parts of the return beam. The use of power control will maximize the number of permissible return channels by equally distributing the received interference power between them.

2.3 Backhaul Data Services ('BDS')

Each Boeing satellite will generate up to five steerable transmit beams and five steerable receive beams. The transmit and receive beams will be operated in pairs to provide two-way data transmission services to users at any point in a satellite's field-of-regard. The agile beams for BDS will be generated on each satellite using multi-beam transmit and receive phased array antennas. Pointing accuracy between user terminals and satellite receive antennas will be maintained using automatic tracking algorithms following ground-commanded initial acquisition. Phased array antennas transmitting BDS signals from each satellite will be slaved to the receive beams.

The forward links for Boeing's BDS will use a transparent bent-pipe transponder and, as a result, the signal characteristics of the forward service links will be the same as the forward feeder links. Both of the BDS forward links will employ TDM channels, each of which will carry a 24.4 Mb/s information-stream. The return links for BDS will also employ a bent-pipe transponder. To provide flexibility for users, Boeing's BDS return links can operate using a signal design of either 60 Mb/s quadrature phase shift keyed ("QPSK") or 120 Mb/s 16 quadrature amplitude modulation ("16 QAM").

2.4 Ku-Band Spectrum Sharing

The Boeing system can operate co-frequency with the broadcast satellite service ("BSS"), the GSO FSS, terrestrial FS networks, and other NGSO FSS systems. To protect GSO satellites, Boeing will employ satellite diversity using a ±15° latitude equatorial exclusion zone for forward and return service links. Before a Boeing satellite enters the exclusion zone, its traffic will be handed off to another Boeing satellite that is outside of the exclusion zone. Boeing satellites operating outside of the exclusion zone will have large discrimination angles as viewed by GSO network earth station antennas.

2.5 IDS Forward and Service Feeder Links

The IDS forward feeder link channels have a bandwidth of 6.25 MHz and are spaced at 7.15 MHz. A total of 122 channels are required for the forward feeder link. Both senses of circular polarization are used with 61 channels on each polarization. TT&C channels are also provided on the forward feeder link at each end of the band. As a result, the bandwidth requirement for the IDS forward feeder link is 450 MHz.

The IDS forward feeder link signal is de-multiplexed and de-modulated on-board the satellite and coded and re-modulated using code division multiplex ("CDM") for transmission to user terminals. Each spread spectrum CDM channel requires 166.7 MHz of bandwidth. A three-cell frequency reuse pattern within a pattern of 37 spot-beams provides service to the user terminals. Both senses of circular polarization and two frequency channels are used in each spot beam, resulting in a forward service link bandwidth requirement of 1000 MHz.

2.6 IDS Return Service and Feeder Links

The IDS return service uses the same 37-spot-beam pattern and three-cell frequency reuse as the forward service link. CDMA is used in a bent-pipe transponder architecture. Each CDMA channel employs a bandwidth of 20 MHz. Two frequency channels and both senses of circular polarization are used in each spot beam, resulting in a bandwidth requirement of 120 MHz for the return service link.

Return service link channels are switched to the feeder link channels based on spot beam loading and, thus, are not one-to-one mapped to the return feeder link channels. Ninety eight return feeder link channels are provided 49 channels on each polarization. Additionally, two TT&C channels are provided for spacecraft operations, resulting in a total return feeder link bandwidth requirement of 1000 MHz.

2.7 BDS Links

The BDS forward feeder link will operate concurrently with the IDS forward feeder link on each satellite using separate gateways. Each of the BDS forward feeder link channels has a bandwidth of 24.0 MHz and uses carrier spacing of 29.16 MHz. A total of five channels are required for the forward feeder uplink using right-hand circular polarization ("RHCP").

The BDS forward service link channels are frequency translated from the forward feeder link frequencies with fixed offsets. The BDS forward service links will operate in the same spectrum as the IDS forward service links using geographic diversity to avoid intra-system interference.

Figure 12:
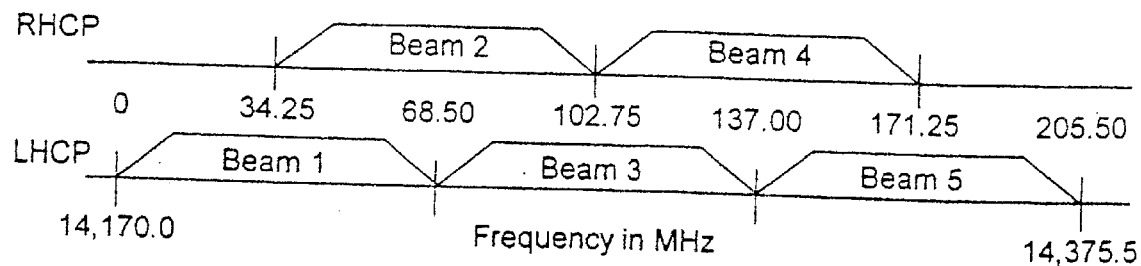
FIG. 12 is a typical frequency band plan.

The BDS return service link uses polarization reuse as shown in the typical frequency band plan in FIG. 12. Each of the BDS return channels has a bandwidth of 58.7 MHz and uses carrier spacing of 68.5 MHz.

BDS return service link channels are translated to the single polarized return feeder link channels with fixed offsets to the typical frequency plan.

2.8 Beacon Link

Within the IDS forward service bandwidth, beacon signals are used to allow the user terminals to acquire and synchronize with the satellite transmissions before initiating service. Two beacon channels will be provided. The first beacon channel will be centered at a frequency between the spot 1 and spot 2 downlink bands of the lower portion of the IDS service downlink band. The second beacon channel will be centered at a frequency between the spot 2 and spot 3 downlink bands of the lower portion of the IDS service downlink band.

TABLE 4

MEO Constellation Orbital Elements

| | |
|---|---|
| Number of Satellites | 20 |
| Number of Orbital Planes | 4 |
| Number of Satellites per Orbit Plane | 5 |
| Inclination of Orbital Planes (degrees) | 57 |
| Period of Orbit (hrs.) | 11.97 |
| Apogee of Orbit (km.) | 20, 182 |
| Perigee of Orbit (km.) | 20, 182 |
| Argument of Perigee for each Orbit (deg.) | 0 |
| Eccentricity | 0 |
| Mean Anomaly of the i-th. Satellite (deg.) | 0, 72, 144, 216, 288, 36, 108, 180, 252, 324, 72, 144, 216, 288, 0, 108, 180, 252, 324, 36 |
| Right Ascension of the Ascending Node of the i-th. Satellite (deg.) | 0, 0, 0, 0, 0, 90, 90, 90, 90, 90, 180, 180, 180, 180, 180, 270, 270, 270, 270, 270 |
| Active Service Arc (deg.) | 360* |

(*Note: At any instant of time, the active service arc is 360°; however, operations outside the exclusion zone occur as the mean anomaly varies from 18° to 162° and 198° to 342°.)

2.9 Details Concerning the Satellites

The spacecraft antennas include two feeder link antennas, seven forward service link antennas and one return service link antenna for the IDS; along with transmit and receive multi-beam phased array antennas for the BDS and an Earth-coverage beacon antenna.

The spacecraft feeder link antennas consist of two focal-point-fed parabolic antennas with steerable splash plates. Two antennas are required in order to provide make-before-break connectivity with the gateway stations. Each of the dual polarized one-meter diameter feeder link antennas is illuminated by a dual-band waveguide feed. The splash plates are gimbaled about two axes to provide antenna-pointing coverage over the Earth field-of-view.

The IDS forward service link antenna suite (FIGS. 13 & 14) uses seven symmetric 0.4-meter lens antennas. Taken together, these antennas provide 37 dual polarized beams covering the spacecraft field-of-regard. One central antenna provides beams with both polarizations for the central seven beam positions. Each of the identical outer six antennas provides beams for five outer beam positions using both polarizations. The boresights and rotations of all of the outer antennas are arranged on the spacecraft nadir surface to properly align each antenna's beams with respect to the aggregate.

A 37-beam direct radiating array is used to generate the IDS return service link beams. These beam patterns, each having RHCP and left-hand circular polarization (LHCP), are designed to match the forward service link antenna beam coverage. As a result, the patterns for the forward service link antenna are also applicable for the corresponding beams of the IDS return service link antenna.

Separate transmit and receive multi-beam phased array antennas are used for the BDS service links. Each antenna can create up to five agile and independent beams. The transmit antennas will use RHCP beams. Two of the BDS receive antenna beams are RHCP, while the remaining three are LHCP. Details concerning phased array antennas can be found in U.S. Pat. Nos. 4,939,527; 5,276,455; 5,488,380; 543,805; and 5,751,248, which I incorporate by reference.

An Earth-coverage beacon is used to facilitate spacecraft acquisition and tracking by the user.

The growth of the "bandwidth on demand" (BOD) market is being fueled by the convergence of data transmission carriage paths for numerous telecommunications services. Many of these telecommunications services are currently provided to consumers via separate lines of transmission, but can be provided more economically using single data carriage paths. For example, services such as basic voice telephony, facsimile transmission, video-conferencing, high-speed data transfer for local area networks ("LANs"), Internet access, and "push" type data broadcast services can be brought together during transmission using standardized data protocols.

Perhaps the greatest challenge in the cost-effective provision of BOD is responding to dynamic variations in each customer's data transmission needs. In the past, the provision of basic telephony involved relatively constant and predictable bandwidth requirements equally divided between the forward and return directions. BOD, however, necessitates constantly changing bandwidth capacity, often with disproportionate forward and return throughput requirements. For example, corporations that have numerous, widely dispersed branch offices may use private computer networks to collect sales information from the field. These same companies also broadcast data and information in the forward direction, addressing new products and services, training procedures, computer software upgrades and other data-intensive applications.

Regardless of the specific use, professional users desire seamless interaction with communications networks. Professional users prefer network communications systems that are capable of avoiding significant delays in data transmission rates, regardless of the amount of data transmitted and the direction employed. The most satisfactory and cost effective method of accommodating this demand is using a data transmission scheme that can dynamically adjust to allocate bandwidth between individual users—expanding to meet the momentary needs of one customer and subsequently contracting to free up capacity for others. This "flexible pipe" approach is the essence of Boeing's BOD transmission architecture.

In the forward direction, IDS will employ a "bit-container" transmission structure, permitting the provision of service to a large number of users through each gateway. The bit-container approach will also enable Boeing to offer individual users alternative modulation/error protection techniques within a bit-container. One type of bit-container under consideration for the Boeing IDS system uses the Motion Picture Experts Group ("MPEG") standard. Because of its widespread use, reliable MPEG components and subsystems are available on a cost-effective basis. The MPEG approach also has many desirable features for IDS, including the fact that input data streams can be multiplexed without decoding/re-encoding.

On the return link, Boeing's IDS system will employ single channel per carrier techniques using CDMA, with a bent-pipe transponder on each satellite. Individual carriers are appropriate because the return link will include transmissions from users at relatively modest bit rates, making the use of a bit-container approach undesirable. Boeing's IDS system is designed to accommodate up to 96 simultaneous users per beam (at 76.8 Kbps), with a total of 37 beams per polarization per spacecraft.

The BDS is designed to support users that need to transfer large amounts of data from a location in a short period of time. BDS will be able to provide high speed (up to 120 Mb/s) return link data transfer from remote locations. At the same time, BDS will permit modest (24.4 Mb/s) forward link capability. BDS will be provided using independently steerable beams and associated transmit/receivers, permitting up to five simultaneous users to be accommodated by each spacecraft. The user terminals for BDS will employ antennas with diameters in the vicinity of one meter, making them useful for operation in remote locations.

The allocation of spectrum between Boeing's IDS and BDS systems will be dictated by consumer demand for each service in a given satellite footprint at particular times of the day. The flexibility and reliability of Boeing's dual BOD transmission schemes will be able to accommodate a wide variety of professional, institutional and governmental uses. A sampling of potential applications include:

Corporate networking for dispersed corporate offices where a number of people in individual in-house networks are tied together in a wide area mesh network.

Banking and commercial transactions, where documents, contracts and databases need to be exchanged with substantial accuracy and in a secure mode.

Distance learning for corporate training, specialized education and professional seminars.

Medical applications include the exchange of data, X-ray images, CAT scan data and EKG traces.

Publishing, where designers, artists and customers must exchange high-resolution color images—both fixed and moving.

Entertainment, where high-resolution audio and video material must be backhauled to a central production and redistribution facility.

Remote mining and exploration activities, where geological sampling data needs to be transmitted back to a central location for analysis.

In each of these examples, users can be expected to have customized communication and data transfer needs, including diverse capacity, bit error rate and availability requirements. Some users will have large transmission capabilities with modest error rates (e.g., 1 in $10^5$) for such applications as multiple high resolution X-rays and distance learning. Other users will have high transmission reliability (e.g., low error rates down to 1 in $10^9$) for conditional access, downloading of software, banking data and other information. In each case, the dynamic data transfer needs of Boeing's customers can be efficiently accommodated utilizing the BOD transmission capabilities of Boeing's IDS and BDS transmission systems.

Boeing's phased array antenna steers beams electronically, permitting continuous connections between satellites and mobile platforms. It measures two feet by three feet and is only about one inch thick, and can be embedded on the surface of aircraft and other mobile platforms. The antenna is designed to acquire and maintain connectivity with Boeing satellites using a beacon tracking technique similar to the approach used in conical scanning. The tracking system can adjust to sudden shifts in relative source location, thus fully compensating for the pitch and roll motions that are inherent in mobile platforms. Boeing terminals with phased array antennas cannot begin transmitting until the correct satellite signal has been acquired and is being tracked. In the event that an antenna loses lock on the satellite beacon signal, all transmissions would cease until the beacon signal has again been acquired and the satellite is being tracked.

The satellite tracking and reception capabilities of Boeing's phased array antenna have been tested on high speed mobile platforms, such as commercial and private aircraft.

Over 2000 hours of operation, these systems have demonstrated that the antenna can track and maintain lock on a satellite signal during normal aircraft maneuvers. Using Boeing's phased array antenna technology, Boeing can provide each of the elements of its ancillary mobile services without resulting in unacceptable interference to other users of the Ku-band.

The use of airborne transmitters raises certain co-frequency interference considerations not present with terrestrial-based transmitters. For example, an airborne transmitter affixed to the metallic fuselage of an aircraft can act as a radiator in all directions and an airborne transmitter at altitude can radiate power for hundreds of miles.

The additional interference concerns relevant to airborne transmitters, however, do not compromise Boeing's ability to protect co-frequency GSO systems. Boeing's ancillary transmissions from airborne platforms will have interference characteristics that are within the ITU and FCC limits for NGSO FSS transmissions in the Ku-band. While the additional interference concerns do raise an issue with respect to protecting co-frequency terrestrial systems, Boeing has been unable to identify any terrestrial services currently operating that would be affected by Boeing's service.

Next, I will describe the signals of the Boeing satellite in terms of the modulation, coding and multiple access schemes used for the various links in the system. To assist in describing the links, a brief description of the spacecraft communications payload is also included. Spare receivers, demodulators, power amplifiers and other relevant subsystems are provided on-board the spacecraft and are activated in the event of a failure. I will describe the basic operation of the system and will not include a discussion of component sparing.

On each spacecraft, two sets of feeder link antennas, receivers and transmitters concurrently track two separate gateway locations. Tracking multiple gateways is required to provide a seamless handoff as each satellite moves from the coverage area of one gateway to another. The IDS feeder link signals from the assigned gateways are demultiplexed and demodulated on-board the spacecraft. Each of the demodulated signals from the active IDS gateway are switched to the appropriate downlink beam modulators, where they are re-encoded and re-modulated as spread spectrum signals. The re-modulated signals are amplified and input to the 37-beam transmit antenna. This process is shown in the block diagram of FIG. 13.

The signal characteristics for the IDS forward feeder link are provided in Table 5.

TABLE 5

Signal Characteristics for the IDS Forward Feeder Link Channel

| | |
|---|---|
| Information Rate | 5.2 Mb/s |
| BER | $10^{-4}$* |
| FEC Coding | ½ rate SCCC** |
| Modulation | QPSK |
| Spectrum Shaping | SRC, $\beta = 0.2$ |
| Necessary Bandwidth | 6.24 MHz |
| Emission Designator | 6M24G7W |
| Multiplex | FDM/TDM |
| Availability Objective | 99.9% |

*Channel BER
**Serial concatenated convolutional code

The signal characteristics for the forward service link are provided in Table 6. Multiple feeder link signals are code division multiplexed onto a single downlink carrier using orthogonal code sequences for each different signal. In a typical CDMA system, signals originate from multiple sources and therefore are not synchronized and orthogonal. As a result, each signal causes additional interference to each of the other CDMA signals. This interference is sometimes referred to as the "cocktail party effect." The more users there are in a channel, the louder (more power) they have to be to be heard by the receiver. When all the signals are synchronized and orthogonal, however, there is no mutual interference and no power increase is necessary over that needed for a single signal. This orthogonal signal structure minimizes the transmit power required and, therefore, minimizes interference into co-frequency services.

TABLE 6

Signal Characteristics for the IDS Forward Service Link Channel

| | |
|---|---|
| Information Rate | 5.2 Mb/s |
| BER | $10^{-9}$ |
| FEC Coding | ½ rate SCCC |
| Spreading Ratio | 24 |
| Modulation | QPSK |
| Spectrum Shaping | SRC, $\beta = 0.33$ |
| Necessary Bandwidth | 166.4 MHz |
| Emissions Designator | 166MG7W |
| Multiplex | CDM/TDM |
| Availability Objective | 99.7% |

Figure 14:
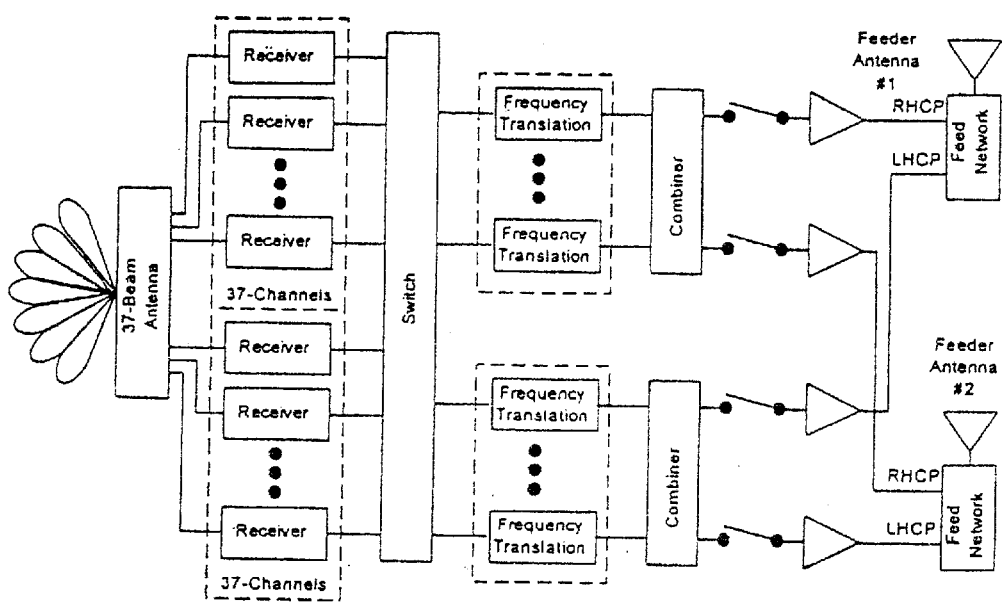
FIG. 14 is a block diagram of the IDS return link.

A block diagram of the IDS return link processing is shown in FIG. 14. Signals on the return link are received from the user terminals through the 37-beam receive antenna using either RHCP or LHCP. The 37 receive channels on each polarization are routed via the switch to the frequency translators for the appropriate feeder downlink channel assignment. The assignment of service link channels to feeder link channels will be done dynamically in the switch and will be at the discretion of the ground control. The feeder link channels will then be multiplexed into a single wideband signal, which will be amplified and transmitted on the assigned feeder downlink antennas to the IDS gateway.

Two signal types have been defined for the IDS return link, a low rate signal and a medium rate signal. The signal characteristics for the IDS low rate and medium rate return link signals are provided in Table 7. Power control is used on the return service link primarily to compensate for rain fade in different parts of the return service beam.

TABLE 7

Signal Characteristics for the IDS Return Service Link Channel

| | Low rate | Medium rate |
|---|---|---|
| Information Rate | 4.8 Kb/s | 76.8 Kb/s |
| BER | $10^{-6}$ | $10^{-6}$ |
| FEC Coding | ⅓ rate, convolutional | ⅓ rate, convolutional |
| Data Modulation | 64-ary orthogonal | 64-ary orthogonal |
| Spreading rate | 16 | 16 |
| Chip Rate | 2.4576 Mc/s | 39.3216 Mc/s |
| Spreading Modulation | QPSK | QPSK |
| Necessary Bandwidth | 1.25 MHZ | 20.0 MHZ |
| Emission Designator | 1M25G7W | 20M0G7W |
| Multiple Access | CDMA | CDMA |
| Availability Objective | 99.7% | 99.7% |

Figure 15:
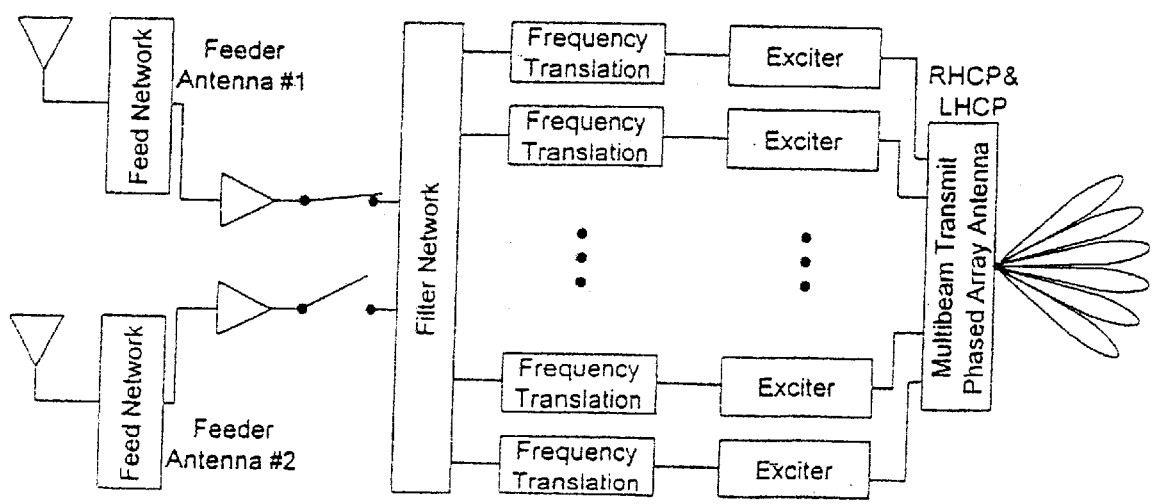
FIG. 15 is a block diagram of the BDS feeder link.

A list of the signal characteristics and the emission designators for a typical BDS forward feeder and service link channel is given in Table 8. The link budget for a typical BDS forward feeder and service link channel (and for our other systems) is provided in Boeing's FCC Application. A block diagram of the BDS payload and connectivity with the feeder link antenna system is shown in FIG. 15.

TABLE 8

Signal Characteristics for the BDS Forward Feeder and Service Link

| | |
|---|---|
| Information Rate | 24.4 Mb/s |
| BER | $10^{-10}$ |
| FEC Coding | Concatenated code, rate 0.614 R-S(204,188) and rate ⅔ convolutional, K = 7 |
| Modulation | QPSK |
| Spectrum Shaping | SRC, β = 0.2 |
| Necessary Bandwidth | 24.0 MHZ |
| Emission Designator | 24M0G7D |

After carrier frequency translation, transmission of the BDS forward carriers is accomplished by the spacecraft transmit phased array antenna. This multi-beam antenna, with an effective area of one square meter, transmits multiple carriers using RHCP, with the total available output power of 13 dBW shared between the active beams, as needed.

A list of the signal characteristics and the emission designators for a typical channel are given in Table 9 or the return link.

TABLE 9

Signal Characteristics for the BDS Return Service and Feeder Link

| | | |
|---|---|---|
| Information Rate | 60 Mb/s | 120 Mb/s |
| BER | $10^{-10}$ | $10^{-10}$ |
| FEC Coding | Concatenated code, rate 0.614 R-S(204,188) and rate ⅔ convolutional, K = 7 | Concatenated code, rate 0.614 R-S(204,188) and rate ⅔ convolutional, K = 7 |
| Modulation | QPSK | 16QAM |
| Spectrum Shaping | SRC, β = 0.2 | SRC, β = 0.2 |
| Necessary Bandwidth | 58.7 MHz | 58.7 MHz |
| Emission Designator | 58M7G7D | 58M707D |

Figure 16:
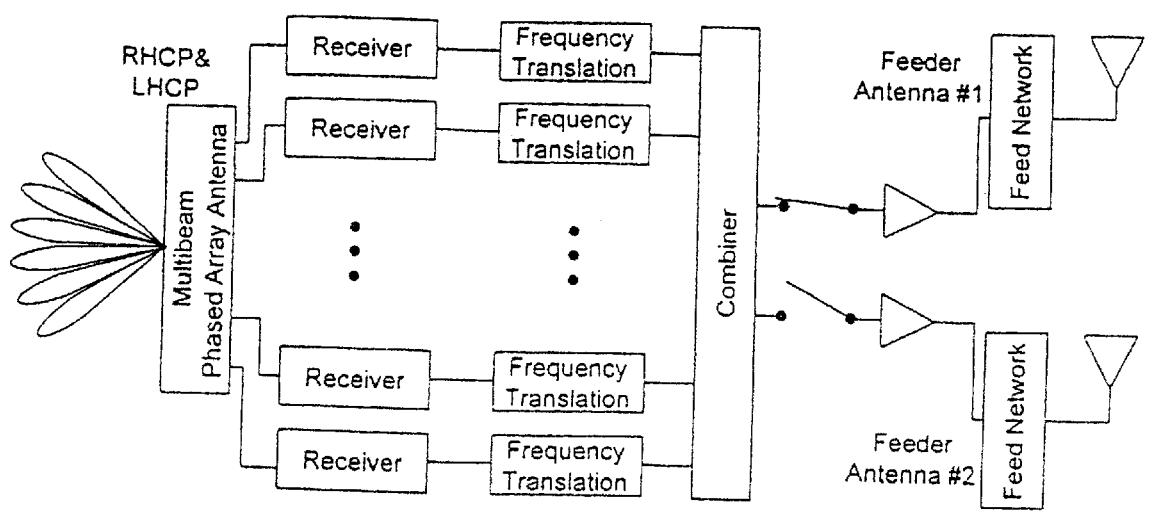
FIG. 16 is a block diagram of the BDS return link.
Figure 17:
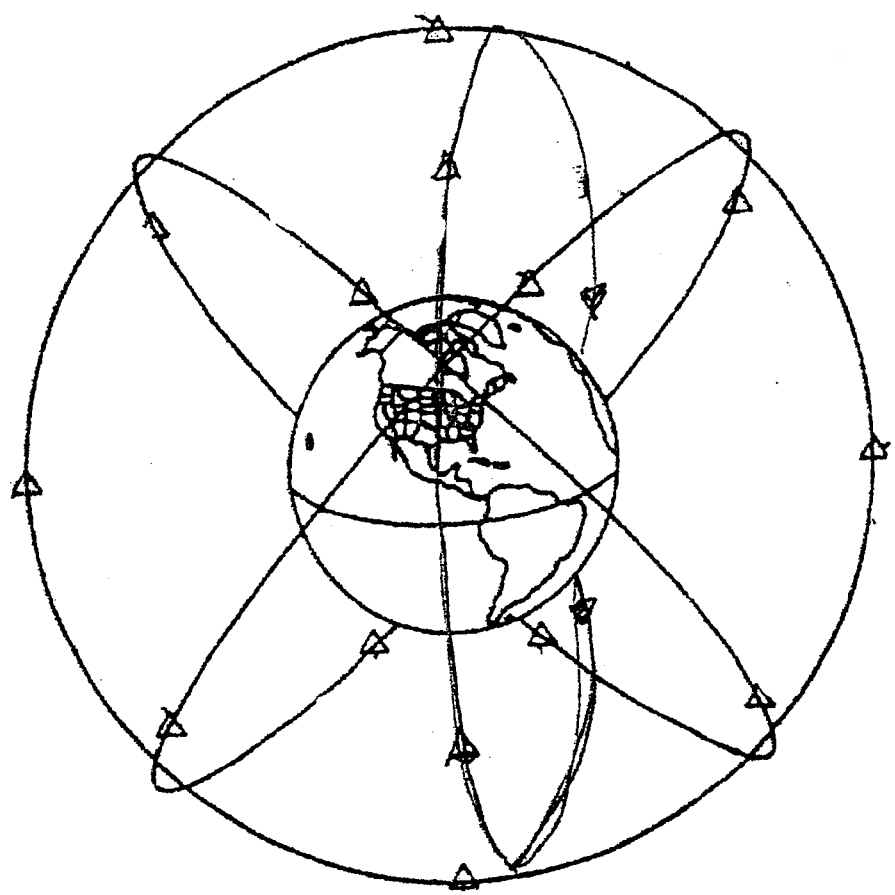
FIG. 17 illustrates Boeing's preferred constellation.

Reception of the BDS return service link carriers on the spacecraft is accomplished using a phased array antenna. The antenna receives multiple carriers using RHCP and LHCP. FIG. 16 shows the block diagram of the BDS return link payload.

The satellite transmits a beacon signal to provide the means for acquisition and tracking of the satellite by the user terminals. Table 10 lists the signal characteristics of the beacon signal.

TABLE 10

Signal Characteristics of the Beacon

| | |
|---|---|
| Information Rate | 1.0 Kb/s |
| BER | $10^{-6}$ |
| FEC Coding | ½ rate convolutional |
| Spreading Rate | 256 |
| Chip Rate | 512 kc/s |
| Spreading Modulation | QPSK |
| Spectral shaping | SRC, b = 0.2 |
| Necessary Bandwidth | 307.2 kHz |
| Emission Designator | 307KG1D |
| Availability Objective | 99.9% |

In most cases, users will employ conventional reflector antennas. Some IDS users may find it advantageous to use Boeing's phased array transmit/receive antenna suite. Unless otherwise specified, the following discussion applies to terminals with both conventional and phased array antennas.

Boeing system user terminals are divided into two segments: (1) the outdoor unit, which includes the antennas, associated RF components, connections to the indoor unit, and, where appropriate, antenna control equipment and (2) the indoor unit, which provides the interfaces to the outdoor unit and equipment that converts the signals to and from user-friendly interfaces such as switchboards, personal computers, instruments and telephones.

Each IDS user terminal will use two antennas. On a conventional reflector-type installation, the two antennas will separately track separate satellites so that handoffs are seamless and unnoticeable by the user. While one satellite is communicating with the terminal, the antenna controller can point the second antenna (or beam) in the expected direction of a second satellite for handoff. After acquiring the satellite beacon signal, the antenna (or beam) can begin closed loop tracking of the satellite.

The user terminal will not make transmissions to the second satellite until after it has acquired the satellite beacon signal. After link acquisition, dynamic power control is used on the return service link to compensate for rain-induced fades. Table 11 provides the technical characteristics of typical user terminals for the IDS. Antennas for the IDS user terminals will meet the sidelobe performance requirements specified by:

$$G = 29 - 25 \cdot \text{Log}(\theta) \quad \left(67 \cdot \frac{\lambda}{D}\right)^\circ \leq \theta \leq 48^\circ$$

$$-10 \text{ dBi} \qquad \theta \geq 48^\circ$$

TABLE 11

Typical IDS User Terminal Parameters

| | |
|---|---|
| Peak Antenna Gain | 36.4 dBi |
| Transmit Data Rate | 76.8 Kb/s |
| Receive Data Rate | 5.2 Mb/s |
| Max EIRP/channel | 45 dBW |
| G/T (dB/K) | 8.3 dB/K |

BDS users will employ conventional reflector-type antennas. Table 12 provides the technical characteristics of typical BDS user terminals. The BDS user terminals utilize a single reflector antenna which will meet the performance requirements specified by:

$$G = 29 - 25 \cdot \text{Log}(\theta) \quad \left(100 \cdot \frac{\lambda}{D}\right) \leq \theta \leq 20^\circ$$

$$-3.5 \text{ dBi} \qquad 20^\circ \leq \theta \leq 26.3^\circ,$$

$$G = 29 - 25 \cdot \text{Log}(\theta) \qquad 26.3^\circ \leq \theta \leq 48^\circ,$$

$$-10 \text{ dBi} \qquad \theta \geq 48^\circ$$

TABLE 12

Typical BDS User Terminal Parameters

| | QPSK | 16 QAM |
|---|---|---|
| Modulation | QPSK | 16 QAM |
| Transmit Antenna Gain | 42.9 dBi | 42.9 dBi |
| Transmit Data Rate | 60 Mb/s | 120 Mb/s |

TABLE 12-continued

Typical BDS User Terminal Parameters

| Receive Data Rate | 24.4 Mb/s | 24.4 Mb/s |
| --- | --- | --- |
| Max EIRP | 48.8 dBW | 58.8 dBW |
| G/T (dB/K) | 18.8 dB/K | 18.8 dB/K |

The parameters of a typical gateway antenna are given in Table 13. Antennas used for the gateway terminals will meet the performance requirements of Section 25.209 of the FCC rules. The transmitted effective isotropic radiated power ("EIRP") from each gateway will meet the requirements of ITU Radio Regulation S5.502, along with any future ITU and FCC limits. Dynamic power control will be used on the gateway uplink to compensate for rain fades.

TABLE 13

Typical Gateway Characteristics

| Antenna Diameter (minimum) | 4.5 m | 4.5 m |
| --- | --- | --- |
| Services | IDS | BDS |
| Transmitted Bit-rate (per channel) | 5.2 Mb/s | 24.4 Mb/s |
| Number of Transmit Channels | 122 | 5 |
| Received information Bit-rate (per channel) | 4.8 or 76.8 Kb/s | 60 or 120 Mb/s |
| EIRP | 68–85 dB W | 68–85 dB W |
| G/T (clear sky) | 28.8 dB/K | 28.8 dB/K |

The Telemetry, Tracking and Control ("TT&C") function monitors the health and status of the spacecraft and alerts operators to any anomalous conditions that may occur. Use of spare components, station-keeping maneuvers and other commands are accomplished by this function.

Two operational TT&C modes are provided in the Boeing system. Normally, TT&C will operate through feeder link antennas. During transfer orbit and in contingency mode, TT&C will operate with an omni-directional antenna. Selection of the operational mode will be made by ground command. Sufficient transmitter power is available to provide for reliable operation using either the feeder link antennas or the omni-directional antenna. The primary telemetry data mode will be pulse code modulation ("PCM").

The satellites will be three-axis stabilized, oriented in a sun-orbit configuration. This configuration always permits the transmitted RF energy to be from the nadir side of the spacecraft, while keeping the solar arrays facing toward the sun. Three-axis stabilization provides for a stable platform that minimizes the amount of communications beam pointing. This configuration and stability effectively permits all of the satellite's IDS beams to be "dragged" across the surface of the Earth. The stable platform also provides a reference for the electronically steered BDS beams.

Each satellite will be based upon a commercially available Boeing design or one of similar capabilities and characteristics if purchased from another spacecraft vendor. The bus design will utilize a modular architecture to maximize integration flexibility, while minimizing integration cycle time. Separate payload, bus and propulsion modules will be built-up and tested in parallel prior to mating.

The structural design of the Boeing satellite provides support for payload and spacecraft subsystems, radiators, and thermal conductors for on-orbit thermal control, stiffness to ensure antenna-pointing accuracy and to reduce dynamic loading during the launch environment. The structural elements will consist of a mix of aluminum honeycomb and graphite epoxy panels with a long heritage of proven space flight. The structural design will permit launch on a wide range of launch vehicles.

The electrical power subsystem provides a reliable (>0.9) source of power throughout the mission life of the satellite, allowing continuous operations through the nearly one-hour duration of maximum eclipse encountered in MEO. The electrical power subsystem uses flight proven components (e.g., GaAs solar cells and NiH batteries) to meet mission requirements.

The thermal control subsystem provides the capability to conduct or to radiate heat to and from various areas of the satellite or to deep space throughout the orbit. The subsystem uses heat pipes embedded in the structural panels of the spacecraft, thermal isolators, heaters, optical coatings and multi-layer insulation blankets with known degradation properties. This thermal control subsystem design is flexible enough to control temperature through the use of multiple zones that permit thermal isolation of one zone from the others, if required.

The attitude control system will maintain the desired sun-orbit profile of the spacecraft throughout the orbit and minimize pointing of the communications beams. Attitude control sub-system components consist of redundant zero momentum reaction wheels, inertial reference units and star sensors. Momentum de-saturation is achieved through the use of electromagnets, while rotational and stabilization maneuvers are performed using reaction control motors. Each of the components of this subsystem has had demonstrated flight experience, which results in a reliable subsystem design that meets mission requirements.

The propulsion system's primary requirement is to provide impulse transfer to the final operational orbit, constellation maintenance station-keeping maneuvers, rotational and stabilization attitude control maneuvers and transfer from the operational orbit to the disposal orbit at the end of the satellite's operational life. A proven nitrogen tetra-oxide/hydrazine system will be used for any required maneuvers of the satellite. The simplicity in the propulsion design also permits a wide selection of launch vehicles, with propellant loading changes made where appropriate.

Other details of the system are in Boeing's FCC Application that I incorporated by reference.

U.S. patent applications Ser. No. 09/672,378, filed Sep. 28, 2000, and 09/728,605, filed Dec. 11, 2000, describe a system and method for managing the collective power transmitted from a plurality of mobile transmitters (aircraft) to a GSO satellite in a BOD system of the nature of the present invention. The method limits the collective power spectral density to less than a specified FCC threshold limit. The system controls the operation of the several transmitters to mitigate against excessive interference reaching a nearby, non-target GSO satellite. I incorporate the applications by reference.

While I have described preferred embodiments, those skilled in the art will readily recognize alternatives, variations, and modifications that might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

I claim:

1. A communication satellite particularly adapted for use in a MEO satellite constellation and system for full service, global communication or communication (voice) and data signals, comprising:

(a) a platform;

(b) at least two transceivers on the platform for receiving and transmitting of the signals, each transceiver including Integrated Digital Service (IDS) and Backhaul Data Service (BDS) for transmission, each transceiver also having a feeder link antenna and a tracking control system adapted for pointing and tracking the feeder link antenna at a selected gateway on the Earth, wherein seamless handoff between gateways occurs because each feeder link antenna has its own, dedicated tracking control system to allow each antenna to point at a different, selected gateway, wherein the IDS includes an antenna that generates a pattern of spot beams to communicate with a plurality of user terminals with each spot beam having a three-cell frequency reuse pattern and dual polarization to provide a spectrum reuse factor in excess of 24, and wherein the BDS has a plurality of paired, steerable transmit and receive beams with forward links employing time division multiplexed (TDM) channels, each channel carrying a 24.4 Mb/s information-stream, and with return links employing a bent-pipe transponder to provide high speed transfer up to 120 Mb/s.

2. The satellite of claim 1 wherein the BDS uses a multi-beam electronically steered phased array antenna.

3. The satellite of claim 1, wherein the IDS system further comprises, for the transmitter, an encoder/modulator paired with a power amplifier for providing a transmission signal to each beam, each encoder/modulator also being coupled with a common switch for all encoder/modulator pairs and wherein the BDS system further comprises a filter network coupled with a plurality of frequency translators, each frequency translator coupled with an exciter for providing a transmission signal to a multibeam transmit phased array antenna.

4. The satellite of claim 1 wherein the IDS uses a "bit container" transmission structure.

5. The satellite of claim 1 wherein the BDS channels have a bandwidth of 58.7 MHz and the BDS uses a carrier spacing of 68.5 MHz.

6. The satellite of claim 4 wherein the BDS channels have a bandwidth of 58.7 MHz and the BDS uses a carrier spacing of 68.5 MHz.

7. The satellite of claim 1 wherein the transmissions use a combination of single polarization and dual-circular polarization.

8. The satellite of claim 4 wherein the transmissions use a combination of single polarization and dual-circular polarization.

* * * * *